(12) United States Patent
Hu et al.

(10) Patent No.: US 12,425,861 B2
(45) Date of Patent: Sep. 23, 2025

(54) METHOD FOR DETERMINING CLASS INFORMATION AND APPARATUS

(71) Applicant: HUAWEI TECHNOLOGIES CO., LTD., Guangdong (CN)

(72) Inventors: Li Hu, Shanghai (CN); Jing Chen, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 819 days.

(21) Appl. No.: 17/245,570

(22) Filed: Apr. 30, 2021

(65) Prior Publication Data

US 2021/0250771 A1 Aug. 12, 2021

Related U.S. Application Data

(63) Continuation of application No. PCT/CN2019/114760, filed on Oct. 31, 2019.

(30) Foreign Application Priority Data

Nov. 2, 2018 (CN) .......................... 201811302764.0

(51) Int. Cl.
*H04W 12/12* (2021.01)
*H04L 9/40* (2022.01)
*H04W 48/06* (2009.01)

(52) U.S. Cl.
CPC ......... *H04W 12/12* (2013.01); *H04L 63/1416* (2013.01); *H04L 63/1425* (2013.01); *H04W 48/06* (2013.01)

(58) Field of Classification Search
CPC ..... H04W 12/12; H04W 48/02; H04W 48/06; H04L 63/1416; H04L 63/1425; H04L 63/1408; H04L 63/1433; H04L 63/1458
See application file for complete search history.

(56) References Cited

U.S. PATENT DOCUMENTS 6,405,318 B1 6/2002 Rowland
9,743,269 B1 * 8/2017 Yadav .................. H04M 15/66
(Continued)

FOREIGN PATENT DOCUMENTS

CN 101453389 A 6/2009
CN 102404741 A 4/2012
(Continued)

OTHER PUBLICATIONS

EPO Partial Supplementary European Search Report issued in European Application No. 198788522.2 on Oct. 27, 2021, 14 pages.
(Continued)

*Primary Examiner* — Robert B Leung
(74) *Attorney, Agent, or Firm* — Fish & Richardson P.C.

(57) ABSTRACT

This application provides example methods and apparatuses for determining class information. One example method includes sending, by a security detection function network element, a subscription data collection event to a mobility management network element, where the subscription data collection event includes a collection range and a reporting condition. The security detection function network element can then receive a data collection service response message from the mobility management network element, where the data collection service response message includes first class information and first traffic data corresponding to the first class information, and where the first traffic data meets the reporting condition. The security detection function network element can then determine abnormal class information based on the first traffic data. The security detection function network element can then send the abnormal class information to a policy control network element.

20 Claims, 12 Drawing Sheets

(56) References Cited

U.S. PATENT DOCUMENTS

| | | | | |
|---|---|---|---|---|
| 2009/0013404 | A1* | 1/2009 | Chow | H04L 63/1458 726/22 |
| 2011/0016525 | A1* | 1/2011 | Jeong | H04L 63/1425 382/218 |
| 2012/0151583 | A1 | 6/2012 | Kang et al. | |
| 2013/0104230 | A1 | 4/2013 | Tang et al. | |
| 2016/0219080 | A1* | 7/2016 | Huang | H04W 24/02 |
| 2016/0261616 | A1* | 9/2016 | Shulman | H04L 63/10 |
| 2016/0344696 | A1* | 11/2016 | Yin | H04L 63/0236 |
| 2017/0086090 | A1 | 3/2017 | Sharma et al. | |
| 2017/0250879 | A1* | 8/2017 | Chadha | H04L 61/35 |
| 2018/0013787 | A1 | 1/2018 | Jiang et al. | |
| 2019/0215305 | A1* | 7/2019 | Monshizadeh | H04W 12/121 |
| 2020/0028874 | A1* | 1/2020 | Lam | H04L 63/145 |

FOREIGN PATENT DOCUMENTS

| | | |
|---|---|---|
| CN | 102447546 A | 5/2012 |
| CN | 103269384 A | 8/2013 |
| CN | 103297946 A | 9/2013 |
| CN | 103918222 A | 7/2014 |
| CN | 104270275 A | 1/2015 |
| CN | 105812200 A | 7/2016 |
| CN | 107835113 A | 3/2018 |
| CN | 108347746 A | 7/2018 |
| WO | 2018086963 A1 | 5/2018 |
| WO | 2018196603 A1 | 11/2018 |

OTHER PUBLICATIONS

3GPP TS 23.122 V15.5.0 (Sep. 2018), "3rd Generation Partnership Project; Technical Specification Group Core Network and Terminals; Non-Access-Stratum (NAS) functions related to Mobile Station (MS) in idle mode (Release 15)," Sep. 2018, 62 pages.

3GPP TS 25.304 V15.0.0 (Jun. 2018), "3rd Generation Partnership Project; Technical Specification Group Radio Access Network; User Equipment (UE) procedures in idle mode and procedures for cell reselection in connected mode (Release 15)," Jun. 2018, 58 pages.

LG Electronics, "Clarification on Access control for Rear," 3GPP TSG-SA WG1 #76, S1-163048, Tenerife, Spain, Nov. 7-10, 2016, 8 pages.

Office Action issued in Chinese Application No. 201811302764.0 on Feb. 8, 2022, 13 pages.

3GPP TS 23.502 V15.3.0 (Sep. 2018), "3rd Generation Partnership Project; Technical Specification Group Services and System Aspects; Procedures for the 5G System; Stage 2(Release 15)," Sep. 2018, 329 pages.

3GPP TS 23.503 V15.3.0 (Sep. 2018), "3rd Generation Partnership Project; Technical Specification Group Services and System Aspects; Policy and Charging Control Framework for the 5G System; Stage 2(Release 15)," Sep. 2018, 69 pages.

Office Action issued in Chinese Application No. 201811302764.0 on Nov. 3, 2020, 35 pages (with English translation).

PCT International Search Report and Written Opinion issued in International Application No. PCT/CN2019/114760 on Jan. 23, 2020, 16 pages (with English translation).

* cited by examiner

--PRIOR ART--

--PRIOR ART--

METHOD FOR DETERMINING CLASS INFORMATION AND APPARATUS

CROSS-REFERENCE TO RELATED APPLICATIONS

This application is a continuation of International Patent Application No. PCT/CN2019/114760, filed on Oct. 31, 2019, which claims priority to Chinese Patent Application No. 201811302764.0, filed on Nov. 2, 2018. The disclosures of the aforementioned applications are hereby incorporated by reference in their entireties.

TECHNICAL FIELD

This application relates to the field of mobile communications technologies and, in particular, to a method for determining class information and an apparatus.

BACKGROUND

In some service scenarios, some terminals are usually easy to implement, have poor security protection, are easily attacked by attackers, and become devices controlled by the attackers. An example of an attack is that an attacker can use virus software to quickly control a large quantity of terminals to form a botnet controlled by the attacker. When a quantity of terminals reaches a certain value, the attacker may control these terminals to simultaneously initiate a large quantity of connections to a server. Consequently, the server is overloaded and breaks down, resulting in a distributed denial of service (DDoS) attack.

Currently, a method for controlling an attack on a terminal is as follows: A base station performs access control on the terminal at a granularity of service urgency of the terminal. To be specific, an access class (AC) is written into a subscriber identity module (SIM) card of the terminal in advance, and different ACs represent different service urgency; when the base station is overloaded due to an attack, the base station sends a broadcast data packet to restrict access of the terminal; after receiving the broadcast data packet, the terminal determines, based on the AC in the SIM card, whether access of the terminal to the base station needs to be restricted, to control access of the terminal.

Disadvantages of the method are: (1) The AC of the terminal is written into the SIM card in advance, and therefore, flexibility is insufficient; and (2) the AC can reflect only service urgency of the terminal, and therefore, a terminal classification method is not sufficiently flexible.

SUMMARY

This application provides a method for determining class information, a method for controlling access of a terminal, and an apparatus, to flexibly classify a terminal and control access of the terminal based on the classification.

According to a first aspect, this application provides a method for determining class information. The method includes: for N terminals that access a network, obtaining, by a core network element, information about the N terminals; and for each terminal in the N terminals, determining, by the core network element, class information of the terminal based on information about the terminal, where the information about the terminal includes some or all of the following information:

function information of the terminal, where the function information is used to indicate capability information of the terminal;

user information of the terminal, where the user information is used to indicate owner information of the terminal;

device information of the terminal, where the device information is used to indicate manufacturing information of the terminal; and location information of the terminal, where the location information is used to indicate a location of the terminal.

Based on this solution, the core network element assigns a class to the terminal, and assigns the class to the terminal based on the information about the terminal. Therefore, a classification manner is relatively flexible. Compared with the classification manner in the background in which classification is performed based on service urgency and a classification result is written into a SIM card in advance, the classification method in this application is more flexible.

In a possible implementation, the function information of the terminal includes some or all of the following parameters: a network capability, a mobile station network capability, a mobile station classmask 2, a mobile station classmask 3, supported coding, an added update class, a voice domain preference, a usage setting of the terminal, device performance of the terminal, and a mobile station-supported network feature, the user information of the terminal includes some or all of the following parameters: a group identifier, an administrator identifier, and a company identifier, and the device information of the terminal includes some or all of the following parameters: a type allocation code and a software version of an equipment identification code of the terminal.

In a possible implementation, the determining, by the core network element, class information of the terminal based on information about the terminal includes: determining, by the core network element, a first class in the class information of the terminal based on location information of the terminal; and determining, by the core network element, a second class in the class information of the terminal based on some or all of the function information, the user information, or the device information of the terminal.

In a possible implementation, if the location information of the terminal is updated, updating, by the core network element, the first class in the class information of the terminal based on updated location information.

In a possible implementation, the core network element sends the class information of the terminal to a communications device, where the communications device includes some or all of the following devices: the terminal, an access network device, a mobility management network element, a session management network element, a policy control network element, and a user plane network element.

In a possible implementation, the core network element receives indication information, where the indication information is used to instruct to determine the class information of the terminal.

In a possible implementation, the core network element is a mobility management network element or a policy control network element.

In a possible implementation, the core network element is a policy control network element; and for each terminal in the N terminals, the policy control network element stores a correspondence between the class information of the terminal and an identifier of the terminal.

According to a second aspect, this application provides a method for controlling access of a terminal. The method includes: receiving, by a policy control network element, an identity list of abnormal terminals from a security detection network element, where the identity list is used to indicate one or more abnormal terminals; determining, by the policy control network element, abnormal class information based on a local policy, the identity list, and a correspondence between class information of a terminal and an identifier of the terminal; and sending, by the policy control network element, the abnormal class information. Based on this solution, the terminal may be controlled based on the abnormal class information. Therefore, access of the terminal is controlled at a granularity of the class information, a function of controlling access of a plurality of terminals at a time can be implemented, and control signaling is reduced.

In a possible implementation, the determining, by the policy control network element, abnormal class information based on a local policy, the identity list, and the correspondence between the class information of the terminal and the identifier of the terminal includes:

determining, by the policy control network element based on the identity list and the correspondence between the class information of the terminal and the identifier of the terminal, candidate abnormal class information corresponding to the identity list, where terminals having same class information in the identity list correspond to same candidate abnormal class information; and for each piece of candidate abnormal class information, determining that the candidate abnormal class information is the abnormal class information if a percentage of a quantity of terminals belonging to the candidate abnormal class information in a quantity of all terminals corresponding to the candidate abnormal class information in the identity list is greater than a preset percentage threshold; or for each piece of candidate abnormal class information, determining that the candidate abnormal class information is the abnormal class information if a quantity of terminals belonging to the candidate abnormal class information in the identity list is greater than a preset quantity threshold.

In a possible implementation, the sending, by the policy control network element, the abnormal class information includes: sending, by the policy control network element, the abnormal class information to an access network device.

In another possible implementation, the sending, by the policy control network element, the abnormal class information includes: sending, by the policy control network element, the abnormal class information to a user plane network element; and the policy control network element further sends flow matching information and a flow processing method to the user plane network element, where the flow matching information is used to match user plane traffic, and the flow processing method is used to control user plane traffic that matches the flow matching information and that is sent by a terminal matching the abnormal class information.

According to a third aspect, this application provides a method for controlling access of a terminal. The method includes: determining, by a security detection network element, abnormal class information based on traffic data of a terminal; and sending, by the security detection network element, the abnormal class information. Based on this solution, the terminal may be controlled based on the abnormal class information. Therefore, access of the terminal is controlled at a granularity of the class information, a function of controlling access of a plurality of terminals at a time can be implemented, and control signaling is reduced.

In a possible implementation, before the determining, by a security detection network element, abnormal class information based on traffic data of a terminal, the method further includes: sending, by the security detection network element, a data collection service request message to a network device, where the data collection service request message includes a data collection unit and a data collection range, the data collection unit is configured to indicate a format of reported data, and the data collection range is used to indicate that collection is performed based on class information of the terminal; and receiving, by the security detection network element, a data collection service response message sent by the network device, where the data collection service response message includes the class information and the traffic data corresponding to the class information, and the traffic data of the terminal indicated by the class information meets a reporting condition.

In a possible implementation, the data collection service request message further includes the reporting condition, and the reporting condition is used to indicate a condition for triggering reporting of the traffic data.

In a possible implementation, the network device includes some or all of the following devices: a mobility management network element, a session management network element, a policy control network element, and a user plane network element.

In a possible implementation, the determining, by a security detection network element, abnormal class information based on traffic data of a terminal includes: detecting, by the security detection network element based on a security detection algorithm, the traffic data corresponding to the class information, to determine the abnormal class information.

According to a fourth aspect, this application provides a method for controlling access of a terminal. The method includes: receiving, by a user plane network element, abnormal class information, flow matching information, and a flow processing method; and if user plane traffic matches the flow matching information and a terminal that sends the user plane traffic matches the abnormal class information, controlling, by the user plane network element, the user plane traffic based on the flow processing method. Based on this solution, the terminal may be controlled based on the abnormal class information. Therefore, access of the terminal is controlled at a granularity of the class information, a function of controlling access of a plurality of terminals at a time can be implemented, and control signaling is reduced.

In a possible implementation, the controlling, by the user plane network element, the user plane traffic based on the flow processing method includes: if the flow processing method includes a discard operation, discarding, by the user plane network element, the user plane traffic; or if the flow processing method includes a quality-of-service modification operation, modifying, by the user plane network element, quality of service of the user plane traffic.

According to a fifth aspect, this application provides a method for controlling access of a terminal. The method includes: receiving, by an access network device, abnormal class information from a core network element; and sending, by the access network device, a broadcast data packet, where the broadcast data packet includes the abnormal class information, and the broadcast data packet is used to restrict access of a terminal matching the abnormal class information. Based on this solution, the terminal may be controlled based on the abnormal class information. Therefore, access of the terminal is controlled at a granulanty of the class information, a function of controlling access of a plurality of terminals at a time can be implemented, and control signaling is reduced.

In a possible implementation, before the sending, by the access network device, a broadcast data packet, the method further includes: receiving, by the access network device, a restriction indication, where the restriction indication is used to instruct to restrict, based on the restriction indication, access of the terminal matching the abnormal class information.

In a possible implementation, after the receiving, by an access network device, abnormal class information, the method further includes: starting, by the access network device, a timer. The sending, by the access network device, a broadcast data packet includes: sending, by the access network device, the broadcast data packet if the timer does not expire.

According to a sixth aspect, this application provides a method for controlling access of a terminal. The method includes: receiving, by a terminal, a broadcast data packet from an access network device, where the broadcast data packet includes abnormal class information; and restricting, by the terminal, access of the terminal if class information of the terminal matches the received abnormal class information, where the class information of the terminal is received by the terminal from a core network element. Based on this solution, the terminal may be controlled based on the abnormal class information. Therefore, access of the terminal is controlled at a granularity of the class information, a function of controlling access of a plurality of terminals at a time can be implemented, and control signaling is reduced.

In a possible implementation, the terminal further receives the class information of the terminal from the core network element, where the class information of the terminal is generated based on information about the terminal, and the information about the terminal includes some or all of the following information:
    function information of the terminal, where the function information is used to indicate capability information of the terminal;
    user information of the terminal, where the user information is used to indicate owner information of the terminal;
    device information of the terminal, where the device information is used to indicate manufacturing information of the terminal; and
    location information of the terminal, where the location information is used to indicate a location of the terminal.

In a possible implementation, the terminal may further release a connection to the access network device.

According to a seventh aspect, this application provides an apparatus. The apparatus may be an access network device, a terminal device, a security function network element, or a chip. The apparatus has a function of implementing the embodiments in any one of the first aspect, the second aspect, the third aspect, or the fourth aspect. The function may be implemented by hardware, or may be implemented by hardware executing corresponding software. The hardware or the software includes one or more modules corresponding to the foregoing functions.

According to an eighth aspect, an apparatus is provided. The apparatus includes a processor and a memory, where the memory is configured to store a computer executable instruction, and when the apparatus runs, the processor executes the computer executable instruction stored in the memory so that the apparatus performs the method for determining class information according to any one of the first aspect or the implementations of the first aspect, or so that the apparatus performs the method for controlling access of a terminal according to any one of the second aspect or the implementations of the second aspect, or so that the apparatus performs the method for controlling access of a terminal according to any one of the third aspect or the implementations of the third aspect, or so that the apparatus performs the method for controlling access of a terminal according to any one of the fourth aspect or the implementations of the fourth aspect, or so that the apparatus performs the method for controlling access of a terminal according to any one of the fifth aspect or the implementations of the fifth aspect, or so that the apparatus performs the method for controlling access of a terminal according to any one of the sixth aspect or the implementations of the sixth aspect.

According to a ninth aspect, this application further provides a computer-readable storage medium. The computer-readable storage medium stores an instruction, and when the instruction is run on a computer, the computer is enabled to perform the methods according to the foregoing aspects.

According to a tenth aspect, this application further provides a computer program product including an instruction. When the computer program product is run on a computer, the computer is enabled to perform the methods according to the foregoing aspects.

According to an eleventh aspect, this application further provides a system. The system includes the policy control network element according to any one of the second aspect or the implementations of the second aspect, the security detection network element according to any one of the third aspect or the implementations of the third aspect, and the user plane network element according to any one of the fourth aspect or the implementations of the fourth aspect. Further, the system may further include the terminal according to any one of the sixth aspect or the embodiments of the sixth aspect.

According to a twelfth aspect, this application further provides a system. The system includes the security detection network element according to any one of the third aspect or the embodiments of the third aspect and the access network device according to any one of the fifth aspect or the embodiments of the fifth aspect. Further, the system may further include the terminal according to any one of the sixth aspect or the embodiments of the sixth aspect.

These aspects or other aspects in this application may be clearer and more intelligible in descriptions in the following embodiments.

DESCRIPTION OF EMBODIMENTS

To make the objectives, technical solutions, and advantages of this application clearer, the following further describes this application in detail with reference to the accompanying drawings. A specific operation method in method embodiments may also be applied to an apparatus embodiment or a system embodiment. In the descriptions of this application, unless otherwise stated, "a plurality" means two or more than two.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

Figure 1:
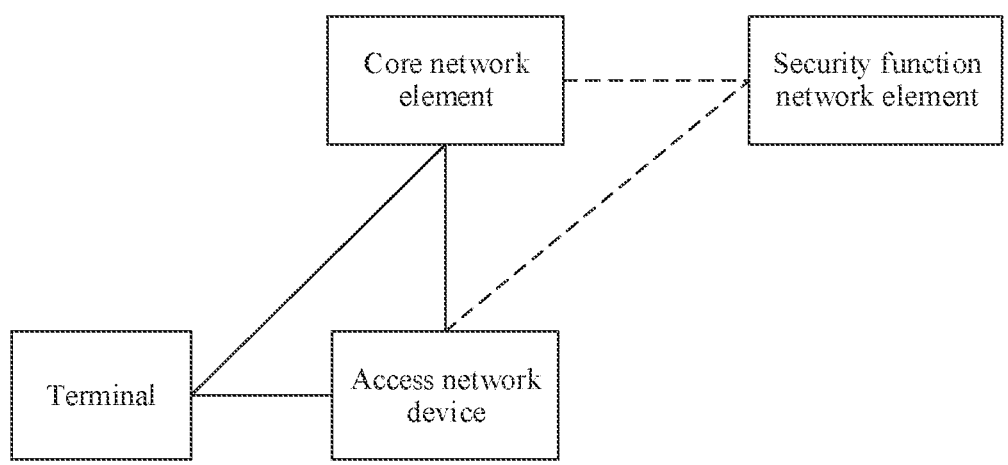
FIG. 1 is a schematic diagram of a possible network architecture according to this application.

FIG. 1 is a schematic diagram of a possible network architecture to which this application is applicable. The network architecture includes an access network device and a core network element. Optionally, the network architecture further includes a security function network element. The access network device may communicate with a terminal in a wired or wireless manner. The terminal may communicate with the core network element by using a non access stratum (NAS) message, for example, by using an N1 interface.

The core network element may include some or all of a mobility management network element, a session management network element, a policy control network element, a user plane network element, and a data management network element.

In this application, the core network element may classify the terminal based on information about the terminal. For example, the mobility management network element may classify the terminal, or the policy control network element may classify the terminal, or the mobility management network element and the policy control network element may classify the terminal.

In this application, the terminal is a device having a wireless transceiver function, and may be deployed on land, including indoor or outdoor, in a handheld manner, or in a vehicle-mounted manner, or may be deployed on water (such as on a ship), or may be deployed in air (such as on an airplane, a balloon, and a satellite). The terminal may be a mobile phone, a tablet computer (pad), a computer with a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, user equipment (UE), or the like. Alternatively, the terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5th generation (5G) network, a terminal device in a future evolved public land mobile network (PLMN), or the like. The terminal may also be sometimes referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a terminal device, a wireless communications device, a UE agent, a UE apparatus, or the like. The terminal may alternatively be fixed or mobile. This is not limited in this embodiment of this application.

The access network device may also be referred to as a radio access network (RAN) device, and is a device that provides a wireless communication function for the terminal. For example, the access network device includes but is not limited to: a 5G next-generation NodeB (g nodeB, gNB), an evolved NodeB (eNB), a radio network controller (RNC), a NodeB (NB), a base station controller (BSC), a base transceiver station (BTS), a home base station (for example, a home evolved nodeB, or a home node B, HNB), a baseband unit (BBU), a transmitting and receiving point (TRP), a transmitting point (TP), a mobile switching center, and the like. Alternatively, the access network device may be a radio controller, a centralized unit (CU), and/or a distributed unit (DU) in a cloud radio access network (CRAN) scenario, or the access network device may be a relay station, an access point, a vehicle-mounted device, a wearable device, a network device in a future 5G network, a network device in a future evolved PLMN network, or the like. The terminal may communicate with a plurality of access network devices using different technologies. For example, the terminal may communicate with an access network device that supports a long term evolution (LTE) network, may communicate with an access network device that supports a 5G network, or may support dual connectivity to an access network device in an LTE network and an access network device in a 5G network. This is not limited in the embodiments of this application.

The user plane network element is mainly responsible for processing a user packet, such as forwarding, charging, and lawful interception. In a 5G network, the user plane network element may be a user plane function (UPF) network element. In a future communications network, such as a 6th generation (6G) network, the user plane network element may still be a UPF network element or have another name. This is not limited in this application.

The session management network element is mainly used for session management, such as session establishment, modification, and release, in a mobile network. For example, a specific function includes assigning an internet protocol (IP) address to a user, and selecting a user plane network element that provides a packet forwarding function. In a 5G network, the session management network element may be a session management function (SMF) network element. In a future communications network such as a 6G network, the session management network element may still be an SMF network element or have another name. This is not limited in this application.

The mobility management network element is mainly used for registration, mobility management, and tracking area update processes of a terminal in a mobile network. The mobility management network element terminates a NAS message, completes registration management, connection management, reachability management, tracking area list (TA list) allocation, mobility management, and the like, and transparently routes a session management (SM) message to the session management network element. In a 5G network, the mobility management network element may be an access and mobility management function (AMF) network element. In a future communications network such as a 6G network, the mobility management network element may still be an AMF network element or have another name. This is not limited in this application.

The data management network element is mainly responsible for managing subscription data, and is responsible for notifying a corresponding network element when the subscription data is modified. In 5G, the data management network element may be a unified data management (UDM) network element. In future communication such as 6G, the data management network element may still be a UDM network element or have another name. This is not limited in this application.

The policy control network element has a subscriber subscription data management function, a policy control function, a charging policy control function, quality of service (QoS) control, and the like. In a 5G network, the policy control network element may be a policy control function (PCF) network element. In a future communications network such as a 6G network, the policy control network element may still be a PCF network element or have another name. This is not limited in this application.

The security detection network element in this application has a security function, and may analyze traffic data of the terminal to discover malicious traffic in the traffic data, that is, discover a terminal with an abnormal behavior. In a specific implementation, in 5G, the security detection network element may be referred to as a security detection function (SEDF) network element or may have another name. In a specific implementation, the security detection network element may be an independent network element, or may be integrated into a network data analysis function (NWDAF) entity, an operation, administration and maintenance (OAM) entity, or an application function (AF) entity. The OAM entity may also be referred to as a network management system, and is configured to provide a group of network management functions, including fault monitoring, fault complaint, fault localization, fault remediation, and the like. The NWDAF entity is configured to provide a big data analysis service. The entity may collect data from a 3rd generation partnership project (3GPP) network and perform big data analysis to provide a better policy. The AF entity is configured to provide an application service, and the application service may be provided by a third party or an operator.

It may be understood that the foregoing functions may be network elements in a hardware device, software functions running on dedicated hardware, or virtualized functions instantiated on a platform (for example, a cloud platform).

For ease of description, in this application, an example in which the terminal is UE, the access network device is a base station, the user plane network element is a UPF network element, the session management network element is an SMF network element, the mobility management network element is an AMF network element, the policy control network element is a PCF network element, the data management network element is a UDM network element, and the security detection network element is an SEDF network element is used for description below. Further, the UPF network element is referred to as a UPF for short, the session management network element is referred to as an SMF for short, the AMF network element is referred to as an AMF for short, the PCF network element is referred to as a PCF for short, the UDM network element is referred to as a UDM for short, and the SEDF network element is referred to as an SEDF for short. To be specific, all UPFs described in this application in the following may be replaced with user plane network elements, all SMFs may be replaced with session management network elements, all AMFs may be replaced with mobility management network elements, all UDMs may be replaced with data management network elements, all SEDFs may be replaced with security detection network elements, all UEs may be replaced with terminals, and all base stations may be replaced with access network devices. A unified description is provided herein, and details are not described later.

5G is mainly oriented to three service scenarios: enhanced mobile broadband (eMBB), enhanced machine type communication (eMTC), and ultra-reliable and ultra-low latency communication (URLLC). eMTC is mainly oriented to an internet of things (IoT) device. This type of device is usually easy to implement, has poor security protection, and is easily attacked by an attacker, and becomes a device controlled by the attacker.

An example of an attack is that an attacker can use virus software to quickly control a large quantity of IoT devices to form a botnet controlled by the attacker. When a scale reaches a certain value, the attacker may control these devices to simultaneously initiate a large quantity of connections to a server. Consequently, the server is overloaded and breaks down, resulting in a DDoS attack.

Therefore, when the server is under the DDoS attack, the server needs to control a terminal that initiates the attack, to restrict access of the terminal.

Figure 2:
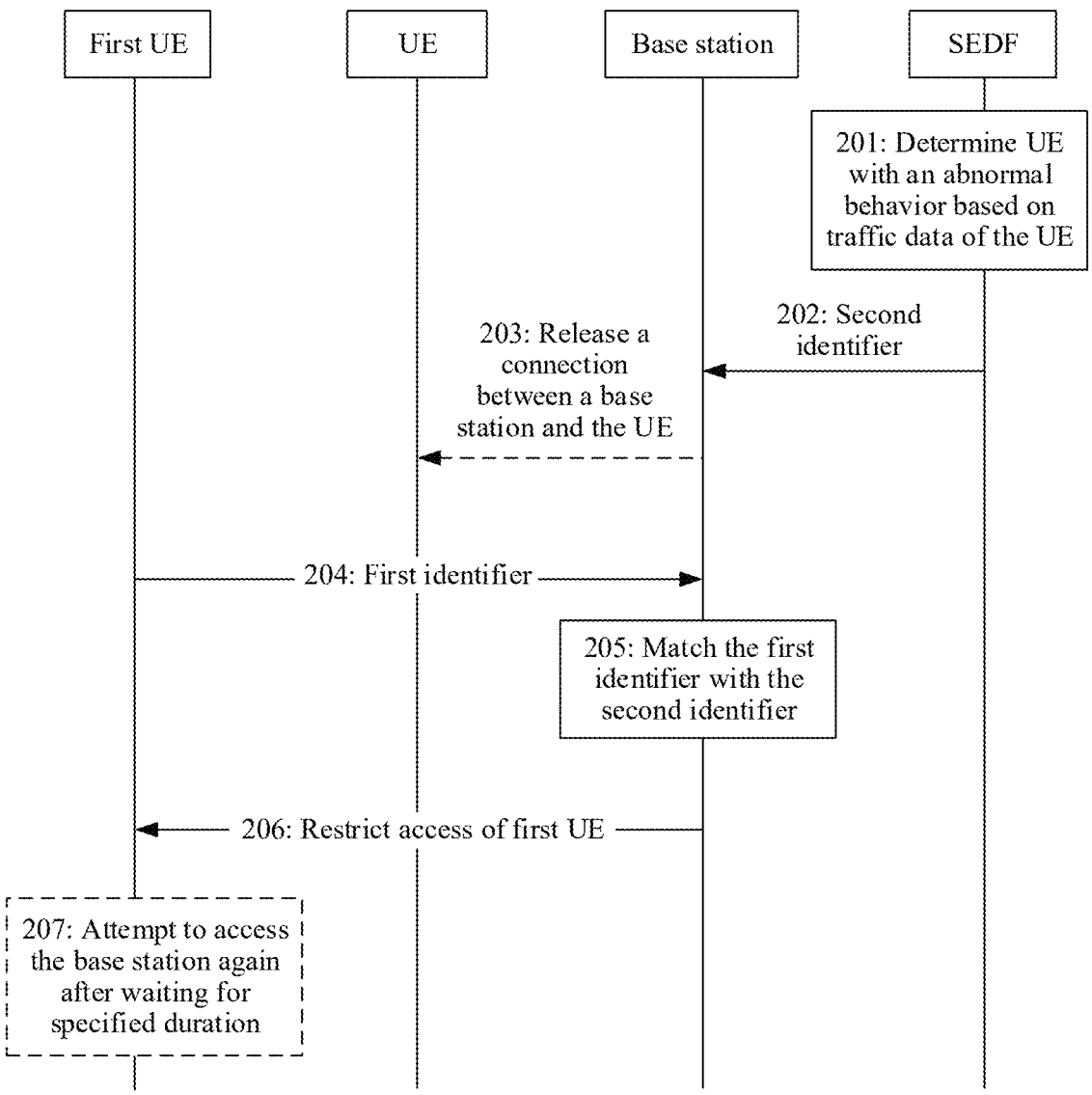
FIG. 2 is a flowchart of a method for controlling access of UE in the prior art.

FIG. 2 shows a method for controlling access of UE in the prior art. The method includes the following steps.

Step 201: An SEDF determines that UE with an abnormal behavior exists.

There may be one or more UEs with abnormal behaviors.

Step 202: The SEDF sends a second identifier of the UE to a base station, where the second identifier is used to indicate the UE with the abnormal behavior.

Step 203: Optionally, the base station releases a connection to the UE based on the second identifier.

Step 204: First UE initiates a connection, and adds a first identifier to the connection, where the first identifier is used to indicate the UE.

Step 205: The base station matches the first identifier with the second identifier.

If the first identifier matches the second identifier, the following step 206 and step 207 continue to be performed.

Step 206: The base station restricts access of the first UE.

Because the first UE is UE with an abnormal behavior, the base station restricts access of the first UE.

Optionally, in step 206, the base station further sends a rejection cause to the first UE. For example, the rejection cause is a security cause.

Step 207: The first UE attempts to access the base station again after waiting for specified duration.

In this embodiment, access of the UEs with the abnormal behaviors is controlled at a granularity of UE. When a DDoS attack occurs, there are a large quantity of, for example, tens of thousands of, UEs with abnormal behaviors. If access of the UEs is controlled at the granularty of UE, tens of thousands of pieces of signaling are required, resulting in high signaling overheads.

Figure 3:
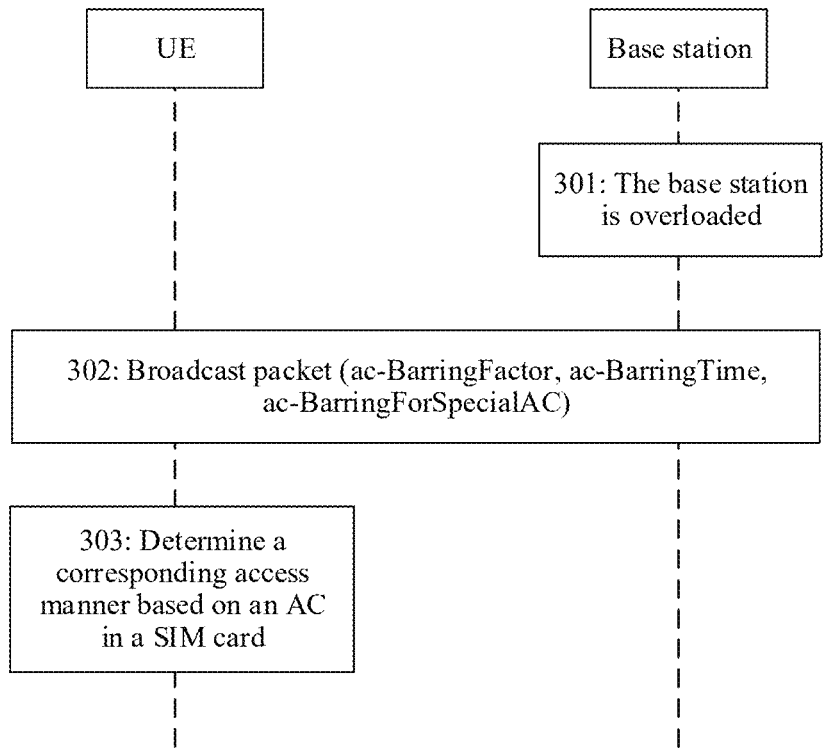
FIG. 3 is a flowchart of another method for controlling access of UE in the prior art.

FIG. 3 shows another method for controlling access of UE provided in the prior art. This embodiment is applicable to overload control of a base station. When the base station is overloaded, the base station may trigger this process. The method includes the following steps.

Step 301: The base station is overloaded.

The base station may be overloaded because a quantity of UEs that currently access the base station is excessively large, a quantity of messages sent by UE is excessively large, or a CPU of the base station is overloaded.

Step 302: The base station sends a broadcast data packet, where the broadcast data packet includes three parameters: ac-BarringFactor, ac-BarringTime, and ac-BarringForSpecialAC.

ac-BarringFactor is a value ranging from 0 to 1. Each time before attempting to access the base station, UE first generates a random number ranging from 0 to 1. If the generated random number is less than ac-BarringFactor, the UE can directly access the base station. Otherwise, the UE does not access the base station and waits for a period of time before attempting to access the base station again.

ac-BarringTime is used to indicate a time for barring access. When the UE decides not to access the base station, the UE waits for a time of ac-BarnngTime.

ac-BarringForSpecialAC is used to indicate one or more access classes (AC). The access class indicates an access class of the UE and is configured on a SIM card of the UE. There are 15 ACs in total, where 0 to 9 are randomly allocated by normal UE, 11 is used by a public land mobile network (PLMN), 12 is a security service, 13 is a public device, 14 is an emergency service, and 15 is a PLMN employee. It can be learned that the ACs 11 to 15 have higher priorities. In normal cases, when AC barring check is performed, UEs of the ACs 0 to 9 all need to start the AC barring check, and UEs of the ACs 11 to 15 can be normally connected. However, ac-BarringForSpecialAC can indicate the ACs 11 to 15. When the parameter ac-BarringForSpecialAC exists, UEs of the indicated ACs also need to start AC barring check.

Step 303: After receiving the broadcast data packet, the UE determines a corresponding access manner based on the AC in the SIM card.

If the AC in the SIM card belongs to the ACs 0 to 9, the UE performs AC barring check directly based on ac-BarringFactor and ac-BarringTime. If the AC in the SIM card belongs to the ACs 11 to 15, whether AC barring check is performed is determined based on ac-BarringForSpecialAC.

In an overload mechanism in the embodiment shown in FIG. 3, access control is performed on the UE at a granularity of service urgency of the UE (an AC is used to indicate the service urgency). The method has the following disadvantages: (1) The AC of the UE is written into the SIM card in advance, and therefore flexibility is insufficient; (2) the overload mechanism only acts on UE attempting to connect to the base station, but cannot control UE that has been connected to the base station, (3) the overload mechanism is spontaneously implemented by the base station. However, the detection mechanism is simple and cannot be used to control some advanced attacks.

To resolve a problem that exists in the embodiments in FIG. 2 and FIG. 3 when access of UE is controlled, this application provides a method for determining class information and a method for controlling access of UE. Description is separately provided below.

Figure 4:
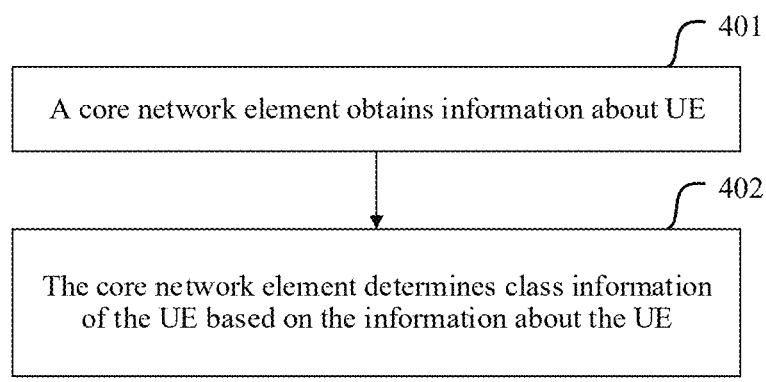
FIG. 4 is a flowchart of a method for determining class information of UE according to this application.

FIG. 4 shows a method for determining class information of UE according to this application. The method may be used to classify the UE. The method includes the following steps.

Step 401: For N UEs that access a network, a core network element obtains information about the N UEs, where N is a positive integer.

The core network element herein may be, for example, an AMF, a PCF, or an AMF and a PCF.

The information about the UE herein includes some or all of the following information:

(1) Function information of the UE, where the function information is used to indicate capability information of the UE and may indicate a function supported by the UE. For example, the function information of the UE may include some or all of the following parameters: a UE network capability, a mobile station network capability (MS Network Capability), a mobile station classmask 2, a mobile station classmask 3, supported coding, an additional update class, a voice domain preference and a usage setting of the UE, device performance, mobile station-supported network feature (MS Network Feature Support), and the like.

(2) User information of the UE, where the user information is used to indicate owner information of the UE. For example, the user information of the UE may include some or all of the following parameters: a group identifier (group ID), an administrator ID, a company ID, and the like.

(3) Device information of the UE, where the device information is used to indicate manufacturing information of the UE. For example, the device information of the UE may be a type allocation code (TAC), a software version (SV), and the like of an equipment identification code of the UE.

(4) Location information of the UE, where the location information is used to indicate a location of the UE. For example, the location information of the UE may be an identifier of a cell in which the UE is currently located, a location area, or the like.

Step 402: For any UE in the N UEs, the core network element determines class information of the UE based on information about the UE.

It should be noted that, information of the UE based on which the core network element determines information about a class to which the UE belongs and a manner in which the core network element determines the information about the class to which the UE belongs may be determined based on a preset policy. The preset policy may also be adjusted by an operator according to a requirement. For example, in a scenario of preventing a potential attack, when the information about the UE is used to classify the UE, corresponding information about the UE may be selected based on different attack manners to classify the UE. An attacker usually attacks the UE in the following manners.

Attack manner 1: An attack is performed by exploiting an application software/communication protocol/operating system/firmware vulnerability.

Vulnerabilities can be classified into an application software vulnerability, a communication protocol vulnerability, and an operating system vulnerability based on different locations of the vulnerabilities. For example, a vulnerability caused by a design defect of application software is referred to as an application software vulnerability, such as a buffer overflow vulnerability in WeChat. A vulnerability caused by a design defect of a communication protocol is referred to as a communication protocol vulnerability, such as a heartbleed vulnerability of a transport layer security (TLS) protocol. A vulnerability caused by a design defect of an operating system is referred to as an operating system vulnerability, such as a buffer overflow vulnerability of Android. A vulnerability caused by a design defect of a driver is referred to as a firmware vulnerability. For these vulnerabilities, the attacker usually can carefully construct an attack data packet and send the attack data packet to UEs that have these vulnerabilities. Due to a vulnerability defect, the attacker can gain control of the UEs through the vulnerabilities.

An application software vulnerability attack is usually related to user information of the UE. For example, an IoT device has a single function, and usually needs to be pre-installed with dedicated application software. The application software may be reflected by the user information of the UE. For example, a shared bicycle belonging to a company A needs to be pre-installed with an APP developed by the company A, and a shared bicycle belonging to a company B needs to be pre-installed with an APP developed by the company B. Once a vulnerability occurs in the APP of the company A, all shared bicycles belonging to the company A may have a security risk. Group IDs or company IDs of UEs can be used to identify different companies. In this case, classification information of the UE may be determined based on the user information of the UE.

A communication protocol vulnerability attack is usually related to function information and/or device information of the UE. For example, if a communications chip is determined before delivery of an IoT device, a communication protocol may be reflected by both the function information and the device information of the UE. For example, a chip of an electric meter manufactured by a company A implements a communication protocol A, and a chip of an electric meter manufactured by a company B does not implement the communication protocol A. If a vulnerability exists in the communication protocol A, all electric meters that are manufactured by the company A and that implement the communication protocol A may have a secunty risk. A type allocation code (TAC) of an international mobile equipment identity (IMEI)/permanent equipment identifier (PEI) of the UE may reflect a manufacturer and a device model of the UE, and capability information of the UE may reflect whether the UE implements a communication protocol with a vulnerability. In this case, the classification information of the UE may be determined based on the function information and/or the device information of the UE.

An operating system vulnerability attack is usually related to the device information of the UE. For example, an operating system is pre-installed on an IoT device before delivery. In this case, the operating system may be reflected by the device information of the UE. For example, a medical device manufactured by a company A is pre-installed with an Android system of a version A, and a medical device manufactured by a company B is pre-installed with an Apple system of a version B. If the Android system of the version A has a vulnerability, medical devices that are pre-installed with the Android system of the version A and that are manufactured by the company A may have a security risk. A type allocation code (Type Allocation Code, TAC) of an international mobile equipment identity (IMEI)/permanent equipment identifier (PEI) of the UE may reflect a manufacturer and a device model of the UE, and a software version (SV) may reflect a version number of an operating system of the UE. In this case, the classification information of the UE may be determined based on the device information of the UE.

A firmware vulnerability attack is usually related to the device information of the UE. For example, if a driver is pre-installed on the IoT device before delivery, the driver may be reflected by the device information of the UE. For example, a driver A is pre-installed on a medical device manufactured by a company A. and a driver B is pre-installed on a medical device manufactured by a company B. If a vulnerability exists in the driver A, medical devices that re pre-installed with the driver A and that are manufactured by the company A may have a security risk. A type allocation code (TAC) of an international mobile equipment identity (IMEI)/permanent equipment identifier (PEI) of the UE may reflect a manufacturer and a device model of the UE. In this case, the classification information of the UE may be determined based on the device information of the UE.

Attack manner 2: A management vulnerability is exploited. A device usually has a default user name and a password, for example, a user name admin and a password admin, before delivery. An administrator sometimes forgets to change the default user name and password. This is easy to be exploited by an attacker and has a management risk. A management vulnerability attack is usually related to the device information of the UE. A type allocation code (TAC) of an international mobile equipment identity (IMEI)/permanent equipment identifier (PEI) of the UE may be used to reflect a manufacturer and a device model of the UE. In this case, the classification information of the UE may be determined based on the device information of the UE.

Attack manner 3: A physical attack is performed. This type of attack requires an attacker to perform an attack at a location close to a terminal, for example, a side-channel attack or a hardware attack. For example, an attacker can move into an area to attack all data collectors in the area to tamper with collected data. The physical attack manner is usually related to the location information of the UE, and a location identifier, such as a CGI or a TAI, of the UE may be used to reflect a location of the UE. In this case, the classification information of the UE may be determined based on the location information of the UE.

Therefore, in this embodiment of this application, the information about the UE is selected to determine the class information of the UE, and the class information may be associated with an attack means of an attacker, to reflect a type of terminals that have a same potential attack. This can control a terminal by classes.

In an implementation, the core network element directly determines, based on the information about the UE, the class information of the UE. For example, the class information of the UE is determined based on some or all of the function information, the user information, the device information, and the location information of the UE.

An example is described below. That the class information of the UE is determined based on the user information of the UE and the device information of the UE is used as an example. Specifically, that the user information of the UE includes the group identifier (group ID), and the device information of the UE includes the TAC and the SV is used as an example. For example, when it is indicated that the user information of the UE is a group ID 1 and it is indicated that the device information is a TAC 1 and an SV 1, a class 1 is assigned to the UE, and is denoted as C1. When it is indicated that the user information of the UE is a group ID 2 and it is indicated that the device information is a TAC 1 and an SV 2, a class 2 is assigned to the UE and is denoted as C2. When it is indicated that the user information of the UE is a group ID 1, and it is indicated that the device information is a TAC 3 and an SV 3, a class 3 is assigned to the UE, and is denoted as C3. The rest may be deduced by analogy.

For example, based on the classification manner, the UE is classified and finally obtained classification information may be, for example:

UE 1: C 1 (that is, the UE 1 belongs to the class 1);
UE 2: C 2 (that is, the UE 2 belongs to the class 2);
UE 3: C 2 (that is, the UE 3 belongs to the class 2);
UE 4: C 3 (that is, the UE 4 belongs to the class 3);
. . . .

In the classification manner, the class information of the UE is determined based on all information about the UE. If information about two UEs belongs to a same class, class information determined by the core network element for the two UEs is the same. However, if any one information about two UEs belongs to different classes, class information determined by the core network element for the two UEs is different.

In another implementation, the core network element determines a first class in the class information of the UE based on dynamic information about the UE and determines a second class in the class information of the UE based on static information about the UE. The dynamic information about the UE represents information, which may be, for example, the location information of the UE, about the UE that may change within a first preset time (generally, a relatively short time). The static information about the UE represents information, which may be, for example, some or all of the function information, the user information, or the device information of the UE, about the UE that does not change within a second preset time (generally, a relatively long time). The first class may also be referred to as dynamic class information, and the second class may also be referred to as static class information. Duration of the first preset time is less than or equal to duration of the second preset time.

An example is described below.

The core network element determines the first class in the class information of the UE based on the location information of the UE. Because both a tracking area identity (TAI) and a cell global identification (CGI) may indicate a current location of the UE, the first class of the UE may be classified based on the TAI or the CGI. For example, the TAI is used as an example. When the UE is in a TA identified by a TAI 1, a first class 1 is assigned to the UE, and is denoted as C11. When the UE is in a TA identified by a TAI 2, a first class 2 is assigned to the UE, and is denoted as C12. When the UE is in a TA identified by a TAI 3 and a TAI 4, a first class 3 is assigned to the UE, and is denoted as C13. The rest may be deduced by analogy. It should be noted that when the UE moves to a new TAI, for example, the UE moves from the TAI 1 to the TAI 2, the first class of the UE needs to be updated from C11 to C12. Certainly, when the UE moves to a new TA, the first class may not need to be updated. For example, when the UE moves from the TAI 3 to the TAI 4, the first class of the UE is still C13. For another example, the CGI is used as an example. When the UE is in a CGI 1 and a CGI 4, a first class 1 is assigned to the UE, and is denoted as C11. When the UE is in a CGI 2, a first class 2 is assigned to the UE, and is denoted as C12. When the UE is in a CGI 3, a first class 3 is assigned to the UE and is denoted as C13. The rest may be deduced by analogy. It should be noted that when the UE moves to a new CGI, for example, the UE moves from the CGI 1 to the CGI 2, the first class of the UE needs to be updated from C11 to C12. Certainly, when the UE moves to a new CGI, the first class may not need to be updated. For example, when the UE moves from the CGI 1 to the CGI 4, the first class of the UE is still C11. In an actual application, one of the TAI or the CGI is selected to assign the second class to the UE. Certainly, the TAI and the CGI may alternatively be combined to assign the second class to the UE.

The core network element determines the second class in the class information of the UE based on some or all of the function information, the user information, or the device information of the UE. The following uses an example in which the second class in the class information of the UE is determined based on the function information, the user information, and the device information of the UE. For example, when the user information of the UE indicates that a company to which the UE belongs is ofo, the device information indicates that a manufacturer is GIANT, and the function information indicates that a device supports an NB-IoT CP protocol, a second class 1 is assigned to the UE 1, and is denoted as C21. When the user information of the UE indicates that a company to which the UE belongs is Mobike, the device information indicates that a manufacturer is PHOENIX, and the function information indicates that a device supports the NB-IoT CP protocol, a second class 2 is assigned to the UE 2, and is denoted as C22. The rest may be deduced by analogy.

For example, based on the classification manner, the UE is classified, and finally obtained classification information may be, for example:

UE 1: C 11 and C 22 (that is, the UE 1 belongs to the first class 1 and the second class 2);
UE 2: C 11 and C 21 (that is, the UE 2 belongs to the first class 1 and the second class 1);
UE 3: C 12 and C 23 (that is, the UE 3 belongs to the first class 2 and the second class 3);
UE 4: C 12 and C 24 (that is, the UE 4 belongs to the first class 2 and the second class 4);
UE 5: C 13 and C 21 (that is, the UE 5 belongs to the first class 3 and the second class 1);
. . . .

In the classification manner, generally, the first class to which the UE belongs may change. To be specific, if the location information of the UE is updated, the core network element updates the first class in the class information of the UE based on updated location information. Certainly, in an actual application, whether the first class and the second class to which the UE belongs may change depends on an actual requirement. This is not limited in this application.

In still another implementation, the core network element determines different classes based on information about different UEs. For example, the core network element determines a first class in the class information of the UE based on the location information of the UE, determines a second class in the class information of the UE based on the function information of the UE, determines a third class in the class information of the UE based on the user information of the UE, and determines a fourth class in the class information of the UE based on the device information of the UE. Certainly, the core network element may alternatively determine only some of the four classes.

An example is described below.

The core network element determines the first class in the class information of the UE based on the location information of the UE. Because both a tracking area identity (TAI) and a cell global identification (CGI) may indicate a current location of the UE, the first class of the UE may be classified based on the TAI or the CGI. For example, the TAI is used as an example. When the UE is in a TA identified by a TAI 1, a first class 1 is assigned to the UE, and is denoted as C11. When the UE is in a TA identified by a TAI 2, a first class 2 is assigned to the UE, and is denoted as C12. When the UE is in a TA identified by a TAI 3 and a TAI 4, a first class 3 is assigned to the UE, and is denoted as C13. The rest may be deduced by analogy. It should be noted that when the UE moves to a new TA, for example, the UE moves from the TAI 1 to the TAI 2, the first class of the UE needs to be updated from C11 to C12. Certainly, when the UE moves to a new TAI, the first class may not need to be updated. For example, when the UE moves from the TAI 3 to the TAI 4, the first class of the UE is still C13. For example, the CGI is used as an example. When the UE is in a CGI 1 and a CGI 4, the first class 1 is assigned to the UE and is denoted as C11. When the UE is in a CGI 2, the first class 2 is assigned to the UE and is denoted as C12. When the UE is in a CGI 3, the first class 3 is assigned to the UE, and is denoted as C13. The rest may be deduced by analogy. It should be noted that when the UE moves to a new CGI, for example, the UE moves from the CGI 1 to the CGI 2, the first class of the UE needs to be updated from C11 to C12. Certainly, when the UE moves to a new CGI, the first class may not need to be updated. For example, when the UE moves from the CGI 1 to the CGI 4, the first class of the UE is still C11. In an actual application, one of the TAI or the CGI is selected to assign the second class to the UE. Certainly, the TA and the CGI may alternatively be combined to assign the second class to the UE.

The core network element determines the second class in the class information of the UE based on the function information of the UE. For example, when the function information of the UE indicates that a device function supports an NB-IoT CP protocol, a second class 1 is assigned to the UE, and is denoted as C21. For another example, when the function information of the UE indicates that a device function supports an NB-IoT UP protocol, a second class 2 is assigned to the UE and is denoted as C22. The rest may be deduced by analogy.

The core network element determines the third class in the class information of the UE based on the user information of the UE. For example, when the user information of the UE indicates that the company to which the UE belongs is ofo, a third class 1 is assigned to the UE, and is denoted as C31. For another example, when the user information of the UE indicates that the company to which the UE belongs is Mobike, a third class 2 is assigned to the UE, and is denoted as C32. The rest may be deduced by analogy.

The core network element determines the fourth class in the class information of the UE based on the device information of the UE. For example, when the device information of the UE indicates that the UE is a device of a model A manufactured by a manufacturer GIANT, a fourth class 1 is assigned to the UE and is denoted as C41. For another example, when the device information of the UE indicates that a device is a device of a model B manufactured by a manufacturer PHOENIX, a fourth class 2 is assigned to the UE and is denoted as C42. The rest may be deduced by analogy.

For example, based on the classification manner, the UE is classified, and finally obtained classification information may be, for example:

UE 1: C 11, C 22, C 31, and C 42 (that is, the UE 1 belongs to the first class 1, the second class 2, the third class 1, and the fourth class 2);

UE 2: C 11, C 21, C 32, and C 42 (that is, the UE 2 belongs to the first class 1, the second class 1, the third class 2, and the fourth class 2);

UE 3: C 12, C 23, C 31, and C 42 (that is, the UE 3 belongs to the first class 2, a second class 3, the third class 1, and the fourth class 2);

UE 4: C 12, C 22, C 32, and C 41 (that is, the UE 4 belongs to the first class 2, the second class 2, the third class 2, and the fourth class 1);

UE 5: C 13, C 21, C 31, and C 41 (that is, the UE 5 belongs to the first class 3, the second class 1, the third class 1, and the fourth class 1);

. . . .

In the classification manner, generally, the first class to which the UE belongs may change. To be specific, if the location information of the UE is updated, the core network element updates the first class in the class information of the UE based on updated location information. The second class, the third class, and the fourth class to which the UE belongs do not change. Certainly, in an actual application, whether the first class, the second class, the third class, and the fourth class to which the UE belongs may change depends on an actual requirement. This is not limited in this application. According to the embodiment shown in FIG. 4, the core network element may assign a class to the UE, and assign the class to the terminal based on some or all of the function information, the user information, the device information, and the location information of the UE. Therefore, the classification manner is relatively flexible. In this embodiment of this application, the information about the UE is selected to determine the class information of the UE, and the class information may be associated with an attack means of an attacker to reflect a type of terminals that have a same potential attack. This can control a terminal by classes. Compared with the classification manner in the prior art that is shown in FIG. 3 and in which classification is performed based on service urgency and a classification result is written into a SIM card in advance, the classification method in this application is more flexible.

Further, after step 402, the core network element may further send the class information of the UE to a communications device. For example, when the AMF determines the class information of the UE, the AMF may send the class information of the UE to the following communications devices: the UE, a base station, an SMF, a PCF, and a UPF. For another example, when the PCF determines the class information of the UE, the PCF may send the class information of the UE to the following communications devices: the UE, a base station, an AMF, an SMF, and a UPF. For another example, when the AMF and the PCF jointly determine the class information of the UE, for example, the AMF determines the first class of the UE and the PCF determines the second class of the UE, or the AMF determines the first class of the UE and the PCF determines the second class, the third class, and the fourth class of the UE, in this implementation, after determining the first class of the UE, the AMF sends the first class of the UE to the PCF, and then the PCF may send the class information of the UE to the following communications devices: the UE, a base station, the AMF, an SMF, and a UPF.

Further, before step 401, the method may further include the following step: receiving, by the core network element, indication information, where the indication information is used to instruct to determine the class information of the UE. In other words, the core network element determines the class information of the UE only after receiving the indication information. For example, the indication information may be sent by a network management system, or may be sent by the UE. This is not limited in this application.

In an example, the following provides several specific implementation methods for determining class information of UE with reference to the accompanying drawings.

Figure 5:
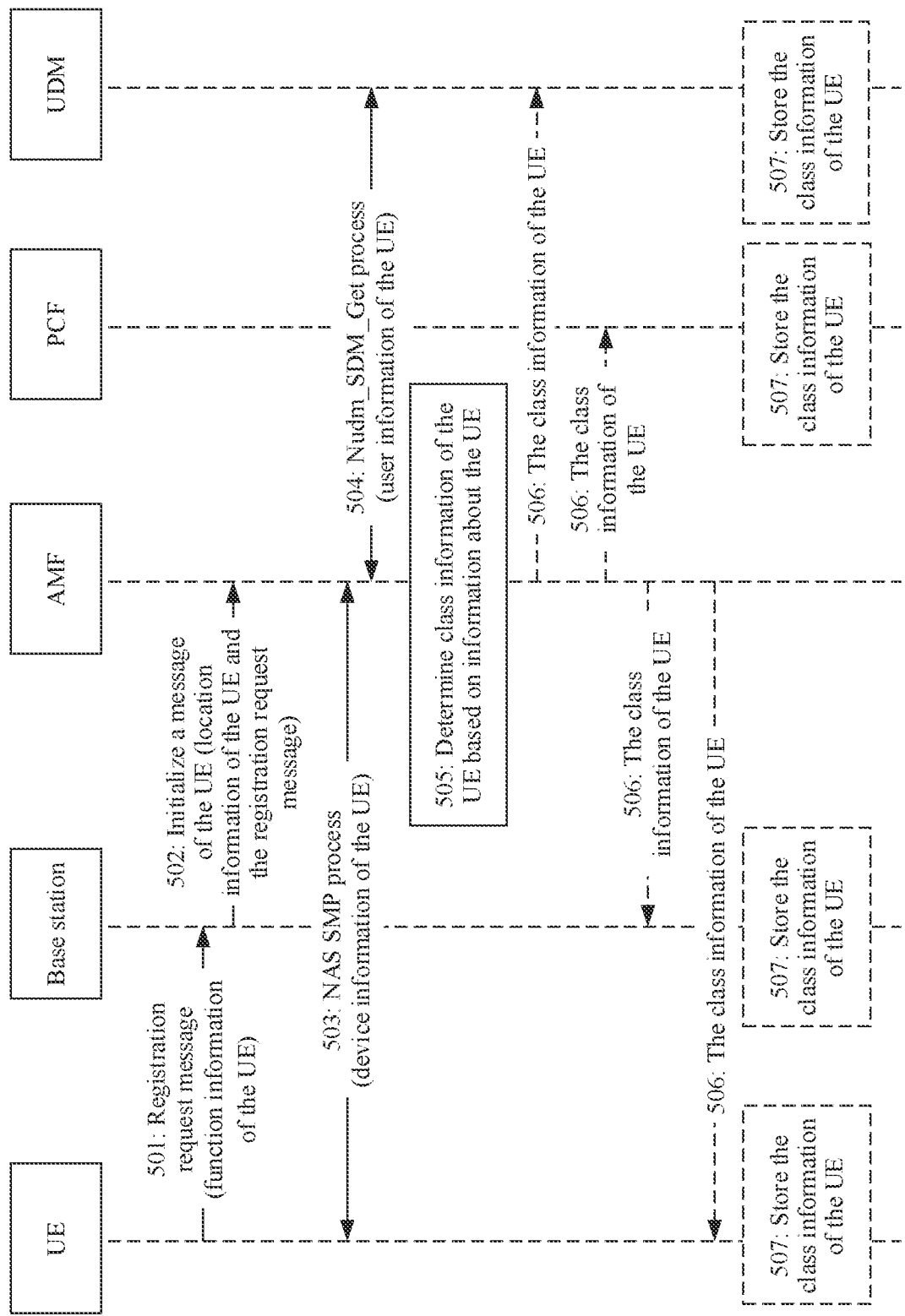
FIG. 5 is a flowchart of another method for determining class information of UE according to this application.

FIG. 5 shows a method for determining class information of UE according to this application. In this method, an AMF determines class information of UE. The method includes the following steps.

Step 501: The UE sends a registration request message to a base station.

Optionally, the message includes capability information of the UE, and the UE capability may include some or all of the following parameters: a UE network capability, a mobile station network capability (MS Network Capability), a mobile station classmask 2, a mobile station classmask 3, supported coding, an added update class, a voice domain preference and a usage setting of the UE, device performance, mobile station-supported network feature (MS Network Feature Support), and the like.

The capability information of the UE may also be referred to as function information of the UE.

Step 502: The base station sends an initial UE message to the AMF, where the initial UE message includes location information of the UE, the registration request message, and the like.

The initial UE message is an N2 message. The AMF may obtain the location information, such as a CGI and a TAI, of the UE from the N2 message The CGI reflects a location of a cell in which the UE is located, and the TAI reflects a location of a tracking area in which the UE is located. The AMF may further obtain the capability information of the UE from the registration request message.

Step 503: The AMF obtains device information of the UE from the UE by using a NAS security mode completed (SMP) message procedure, where the device information may be, for example, a TAC or an SV in an IMEI/PEI.

For example, the AMF may obtain a permanent equipment identifier (PEI) from the UE by using a NAS SMP procedure, and the PEI may reflect device-related information such as a manufacturer of a device.

Step 504: The AMF obtains user information of the UE from a UDM by using a Nudm_SDM_Get procedure.

The user information of the UE may be specifically SIM card-related information. For example, the SIM card-related information obtained from the UDM by using the Nudm_SDM_Get procedure includes information such as a group identifier (group ID), an administrator ID, and a company ID. The group ID may reflect a group class of the UE, the administrator ID may reflect the user information of the UE, and the company ID may reflect information about a company that the UE belongs to.

Step 505: The AMF determines the class information of the UE based on information about the UE.

For a specific implementation method in which the AMF determines the class information of the UE, refer to related descriptions in the embodiment shown in FIG. 4. Details are not described herein again.

Optionally, the AMF stores the class information of the UE in a context of the UE.

Step 506: The AMF sends the class information of the UE to some or all of the following communications devices: a UDM, a PCF, the UE, and the base station.

Optionally, the AMF may send the class information of the UE to the PCF by invoking a service interface opened by the PCF. A service provided by the PCF may include Npcf_AMPolicyControl.

Optionally, the AMF may send the class information of the UE to the UDM by invoking a service interface opened by the UDM. A service provided by the UDM may include a subscriber data management service, a UE context management service, and the like.

Optionally, the AMF may send the class information of the UE to the UE by using a NAS message. For example, the NAS message is a registration accept message.

Optionally, the AMF may send the class information of the UE to the base station by using an N2 message. For example, the N2 message is an initial context setup message.

Step 507: A communications device that obtains the class information of the UE stores the class information of the UE.

For example, the PCF stores the obtained class information of the UE in context information of the UE.

For example, the UDM stores the obtained class information of the UE in the context information of the UE.

For example, the base station stores the obtained class information of the UE in the context information of the UE.

For example, the UE locally stores the obtained class information of the UE.

In an implementation, in step 501 and step 502, indication information may further be added, where the indication information is used to instruct to determine the class information of the UE. Therefore, when receiving the indication information, the AMF may perform step 505 based on the indication information.

In another implementation, the AMF may further receive the indication information from another network element such as an AF network element so that the AMF performs step 505 based on the indication information when receiving the indication information.

Based on the embodiment shown in FIG. 5, after determining the class information of the UE, the AMF may send the class information of the UE to some or all of the following devices: the PCF, the UDM, the base station, and the UE.

Case 1: The AMF sends the class information of the UE to the PCF and the UDM, and the AMF stores the class information of the UE so that the AMF can store the class information of the UE in the context of the UE, the PCF can store the class information of the UE in the context of the UE, and the UDM can store the class information of the UE in the context of the UE.

Case 2: The AMF sends the class information of the UE only to the UDM or the PCF, the UDM or the PCF may store the class information of the UE in the context of the UE, and the AMF does not store the class information of the UE.

Case 3: The AMF sends the class information of the UE to the UDM and the PCF, and the AMF does not store the class information of the UE so that the UDM can store the class information of the UE in the context of the UE, and the PCF can store the class information of the UE in the context of the UE.

Case 4: The AMF sends the class information of the UE to the base station, the UE, and the PCF, and the AMF also stores the class information of the UE so that the AMF can store the class information of the UE in the context of the UE, the PCF can store the class information of the UE in the context of the UE, the base station can store the class information of the UE in the context of the UE, and the UE can store the class information of the UE.

Certainly, other cases are further included and are not listed one by one herein. In other words, according to the embodiment shown in FIG. 5, after the AMF determines the class information of the UE, some or all of the following devices: a core network element, the UE, and the base station may be enabled to obtain the class information of the UE. For a device that has obtained the class information of the UE, the class information of the UE may be locally stored and may be locally obtained when the class information of the UE needs to be used subsequently. For another device that does not obtain the class information of the UE, the class information of the UE may be obtained from a device that stores the class information when the class information of the UE needs to be used subsequently.

It should be noted that when storing the class information of the UE, the communications device may store a correspondence or a mapping relationship between an identifier of the UE and the class information of the UE.

Figure 6:
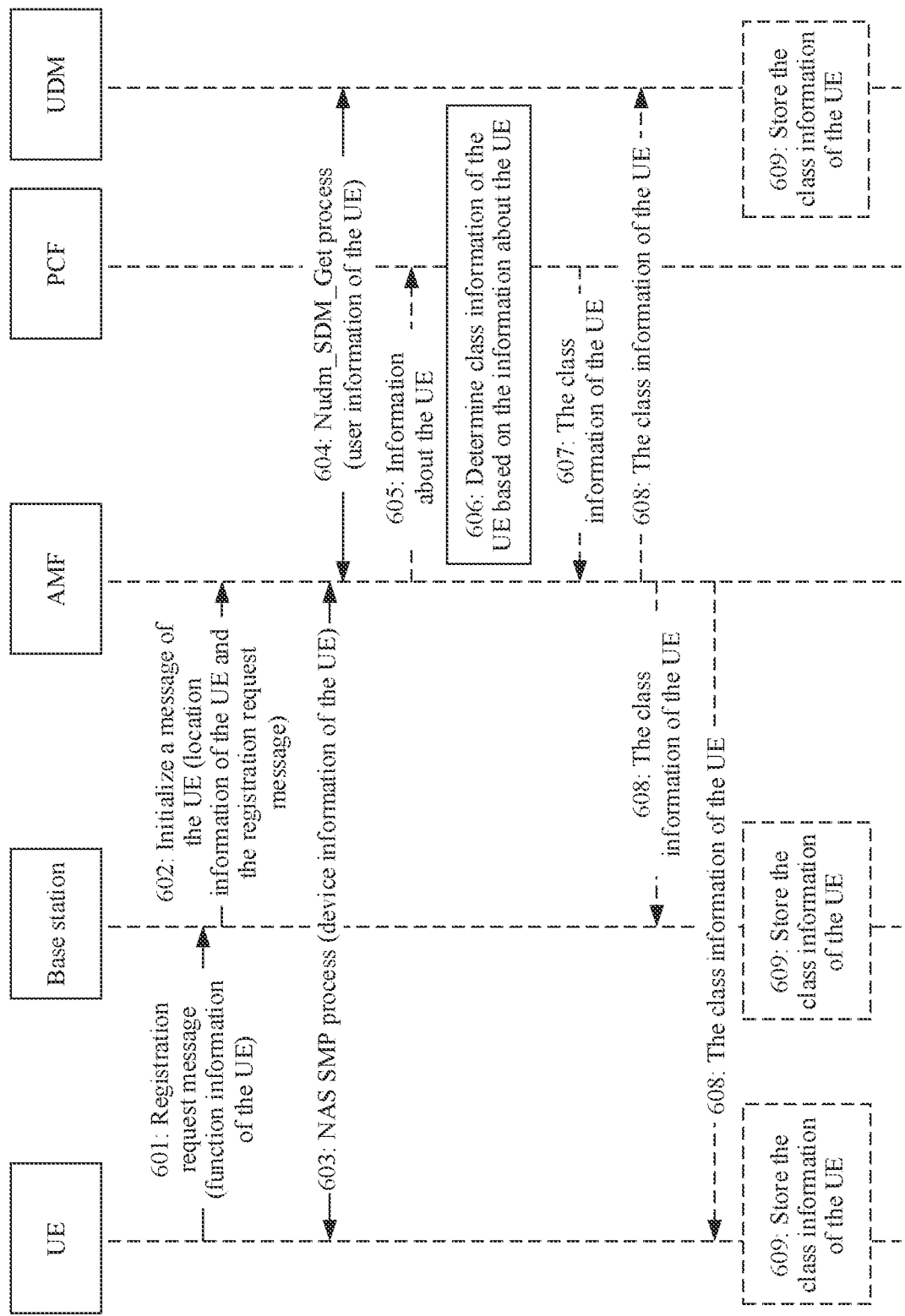
FIG. 6 is a flowchart of another method for determining class information of UE according to this application.

FIG. 6 shows another method for determining class information of UE according to this application. In this method, a PCF determines class information of UE. The method includes the following steps.

Step 601 to step 604 are the same as step 501 to step 504 shown in FIG. 5. Refer to the foregoing descriptions. Details are not described again.

Step 605: The AMF sends information about the UE to the PCF.

For example, the AMF sends the information about the UE to the UE by invoking a service-oriented interface of the PCF. The information about the UE herein may include function information of the UE, location information of the UE, user information of the UE, device information of the UE, and the like. A service provided by the PCF may be Npcf_AMPolicyControl.

Step 606: The PCF determines the class information of the UE based on information about the UE.

Optionally, the PCF further stores the class information of the UE in a context of the UE.

A specific implementation in which the PCF determines the class information of the UE is the same as the method for determining the class information of the UE in step 505 in the embodiment shown in FIG. 5. Refer to the foregoing descriptions.

Step 607: The PCF sends the class information of the UE to the AMF.

Step 608: The AMF sends the class information of the UE to some or all of the following communications devices: a UDM, the UE, and the base station.

Optionally, the AMF may send the class information of the UE to the UDM by invoking a service interface opened by the UDM. A service provided by the UDM may include a subscriber data management service, a UE context management service, and the like.

Optionally, the AMF may send the class information of the UE to the UE by using a NAS message. For example, the NAS message is a registration accept message.

Optionally, the AMF may send the class information of the UE to the base station by using an N2 message. For example, the N2 message is an initial context setup message.

Step 609: A communications device that obtains the class information of the UE stores the class information of the UE.

For example, the UDM stores the obtained class information of the UE in the context information of the UE.

For example, the base station stores the obtained class information of the UE in the context information of the UE.

For example, the UE locally stores the obtained class information of the UE.

In an implementation, in step 601, step 602, and step 605, indication information may further be added, where the indication information is used to instruct to determine the class information of the UE. Therefore, when receiving the indication information, the PCF performs step 606 based on the indication information.

In another implementation, the PCF may further receive the indication information from another network element such as an AF network element so that the PCF performs step 606 based on the indication information when receiving the indication information.

Based on the embodiment shown in FIG. 6, after determining the class information of the UE, the PCF may send the class information of the UE to some or all of the following devices: the AMF, the UDM, the base station, and the UE.

Case 1: The PCF sends the class information of the UE to both the AMF and the UDM, and the PCF also stores the class information of the UE so that the PCF can store the class information of the UE in the context of the UE, the UDM can store the class information of the UE in the context of the UE, and the AMF can store the class information of the UE in the context of the UE.

Case 2: The PCF sends the class information of the UE only to the UDM, and the PCF does not store the class information of the UE so that the UDM can store the class information of the UE in the context of the UE.

Case 3: The PCF sends the class information of the UE to the UDM, and the PCF stores the class information of the UE so that the UDM can store the class information of the UE in the context of the UE, and the PCF can store the class information of the UE in the context of the UE.

Case 4: The PCF sends the class information of the UE to the base station, the UE, and the AMF so that the base station can store the class information of the UE in the context of the UE, the UE can store the class information of the UE, the AMF can store the class information of the UE in the context of the UE, and the PCF can store the class information of the UE in the context of the UE.

Certainly, other cases are further included, and are not listed one by one herein. In other words, according to the embodiment shown in FIG. 6, after the PCF determines the class information of the UE, some or all of the following devices; a core network element, the UE, and the base station may be enabled to obtain the class information of the UE. For a device that has obtained the class information of the UE, the class information of the UE may be locally stored and may be locally obtained when the class information of the UE needs to be used subsequently. For another device that does not obtain the class information of the UE, the class information of the UE may be obtained from a device that stores the class information when the class information of the UE needs to be used subsequently.

It should be noted that when storing the class information of the UE, the communications device may store a correspondence or a mapping relationship between an identifier of the UE and the class information of the UE.

Figure 7:
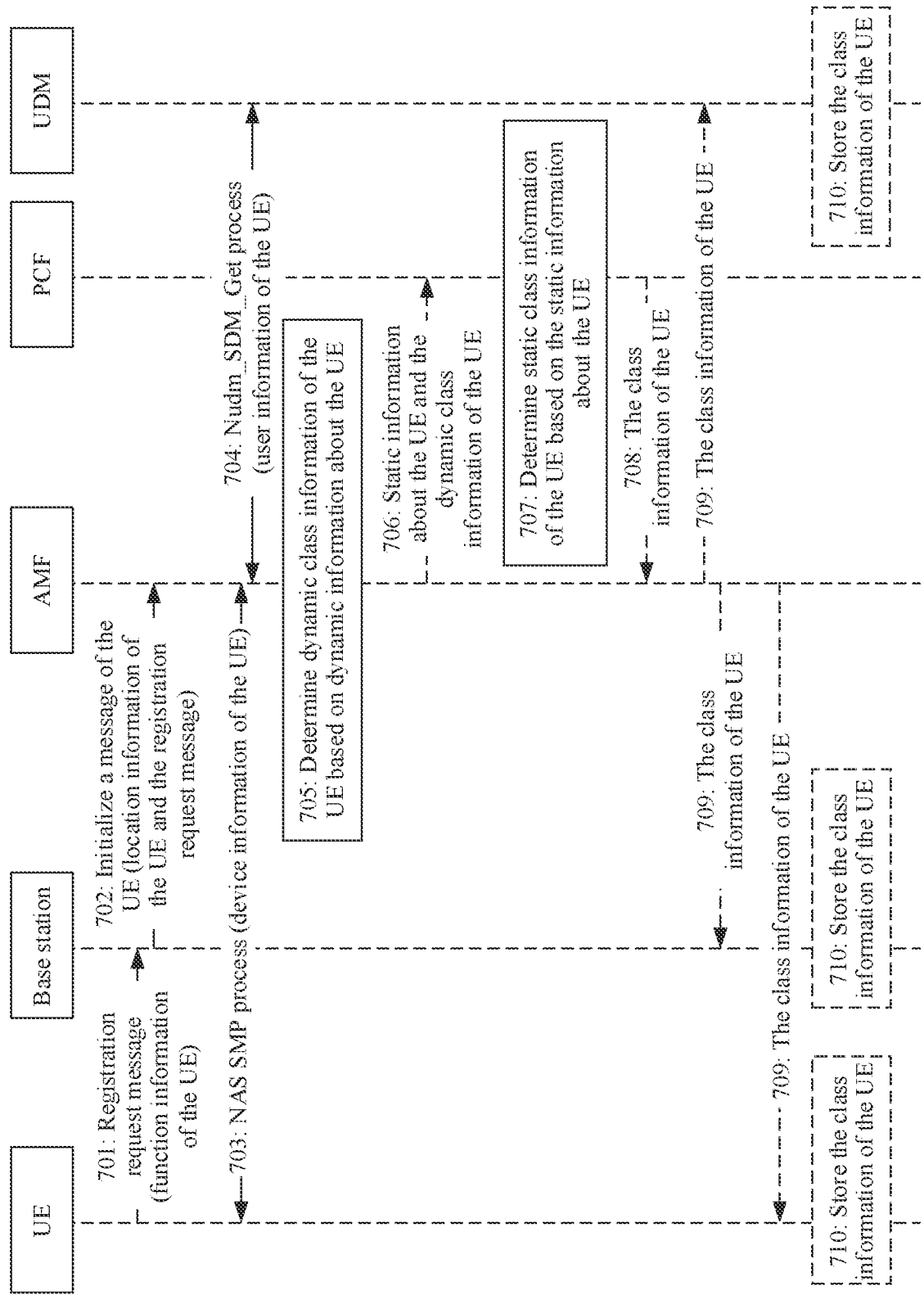
FIG. 7 is a flowchart of another method for determining class information of UE according to this application.

FIG. 7 shows another method for determining class information of UE according to this application. In this method, an AMF and a PCF jointly determine class information of UE. The method includes the following steps.

Step 701 to step 704 are the same as step 501 to step 504 shown in FIG. 5. Refer to the foregoing descriptions. Details are not described again.

Step 705: The AMF determines dynamic class information of the UE based on dynamic information about the UE.

Herein, the dynamic information of the UE may be, for example, location information of the UE. The dynamic class information is a first class of the UE. In other words, the AMF determines the first class of the UE based on the location information of the UE.

Step 706: The AMF sends the static information and the dynamic class information of the UE to the PCF.

The static information herein is some or all of user information of the UE, function information of the UE, and device information of the UE.

For example, the AMF sends the static information and the dynamic class information of the UE to the UE by invoking a service-oriented interface of the PCF. A service provided by the PCF may be Npcf_AMPolicyControl.

Step 707: The PCF determines static class information of the UE based on static information about the UE.

The static class information herein has different meanings in different classification modes. For example, if a second class is determined based on some or all of the user information of the UE, the function information of the UE, and the device information of the UE, the static class information herein refers to the second class of the UE. For another example, if the second class in the class information of the UE is determined based on the function information of the UE, a third class in the class information of the UE is determined based on the user information of the UE, and a fourth class in the class information of the UE is determined based on the device information of the UE, the static class information herein refers to the second class, the third class, and the fourth class of the UE.

The PCF may determine the static class information of the UE, and the PCF may obtain the dynamic class information of the UE from the AMF so that the PCF can obtain the class information of the UE (including the static class information of the UE and the dynamic class information of the UE). Optionally, the PCF further stores the class information of the UE in a context of the UE.

Step 708: The PCF sends the class information of the UE to the AMF.

Step 709. The AMF sends the class information of the UE to some or all of the following communications devices: a UDM, the UE, and the base station.

Optionally, the AMF may send the class information of the UE to the UDM by invoking a service interface opened by the UDM. A service provided by the UDM may include a subscriber data management service, a UE context management service, and the like.

Optionally, the AMF may send the class information of the UE to the UE by using a NAS message. For example, the NAS message is a registration accept message.

Optionally, the AMF may send the class information of the UE to the base station by using an N2 message. For example, the N2 message is an initial context setup message.

Step 710: A communications device that obtains the class information of the UE stores the class information of the UE.

For example, the UDM stores the obtained class information of the UE in the context information of the UE.

For example, the base station stores the obtained class information of the UE in the context information of the UE.

For example, the UE locally stores the obtained class information of the UE.

In an alternative implementation, step 706 to step 710 may be replaced with the following: After determining the dynamic class information of the UE, the AMF sends the dynamic class information of the UE to another communications device, and after determining the static class information of the UE, the PCF sends the static class information of the UE to another communications device.

In an alternative implementation, step 706 to step 710 may be replaced with the following: After determining the dynamic class information of the UE, the AMF sends the dynamic class information of the UE to the PCF, and after determining the static class information of the UE, the PCF determines the class information of the UE based on the static class information and the dynamic class information, and then sends the class information of the UE to another communications device.

In an implementation, in step 701, step 702, and step 706, indication information may further be added, where the indication information is used to instruct to determine the class information of the UE. Therefore, when receiving the indication information, the AMF performs step 705 based on the indication information, and when receiving the indication information, the PCF performs step 707 based on the indication information.

In another implementation, the AMF and the PCF may further receive the indication information from another network element such as an AF network element so that the AMF and the PCF perform step 705 and step 707 based on the indication information when receiving the indication information. Based on the embodiment shown in FIG. 7, after the AMF determines the dynamic class information in the class information of the UE and the PCF determines the static class information in the class information of the UE, the class information of the UE may be sent to another device. For example, based on the implementation of the embodiment shown in FIG. 7, after the PCF sends the class information of the UE to the AMF, the AMF may send the class information of the UE to some or all of the following communications devices: the UE, the base station, and the UDM, and the PCF may or may not store the class information of the UE. Separate descriptions are provided below.

Case 1: The AMF sends the class information of the UE to the UDM, and the AMF stores the class information of the UE so that the AMF can store the class information of the UE in the context of the UE, and the UDM can store the class information of the UE in the context of the UE. In addition, the PCF also stores the class information of the UE in the context of the UE.

Case 2: The AMF sends the class information of the UE only to the UDM, the UDM may store the class information of the UE in the context of the UE, and the AMF does not store the class information of the UE. In addition, the PCF does not store the class information of the UE.

Case 3: The AMF sends the class information of the UE to the UDM, and the AMF does not store the class information of the UE so that the UDM can store the class information of the UE in the context of the UE. In addition, the PCF also stores the class information of the UE in the context of the UE.

Case 4: The AMF sends the class information of the UE to the base station and the UE, and the AMF also stores the class information of the UE so that the AMF can store the class information of the UE in the context of the UE, the base station can store the class information of the UE in the context of the UE, and the UE can store the class information of the UE. In addition, the PCF also stores the class information of the UE.

Certainly, other cases are further included, and are not listed one by one herein. In other words, according to the embodiment shown in FIG. 7, after the AMF and the PCF jointly determine the class information of the UE, some or all of the following devices: a core network element, the UE, and the base station may be enabled to obtain the class information of the UE. For a device that has obtained the class information of the UE, the class information of the UE may be locally stored, and may be locally obtained when the class information of the UE needs to be used subsequently. For another device that does not obtain the class information of the UE, the class information of the UE may be obtained from a device that stores the class information when the class information of the UE needs to be used subsequently.

It should be noted that when storing the class information of the UE, the communications device may store a correspondence or a mapping relationship between an identifier of the UE and the class information of the UE.

Figure 8:
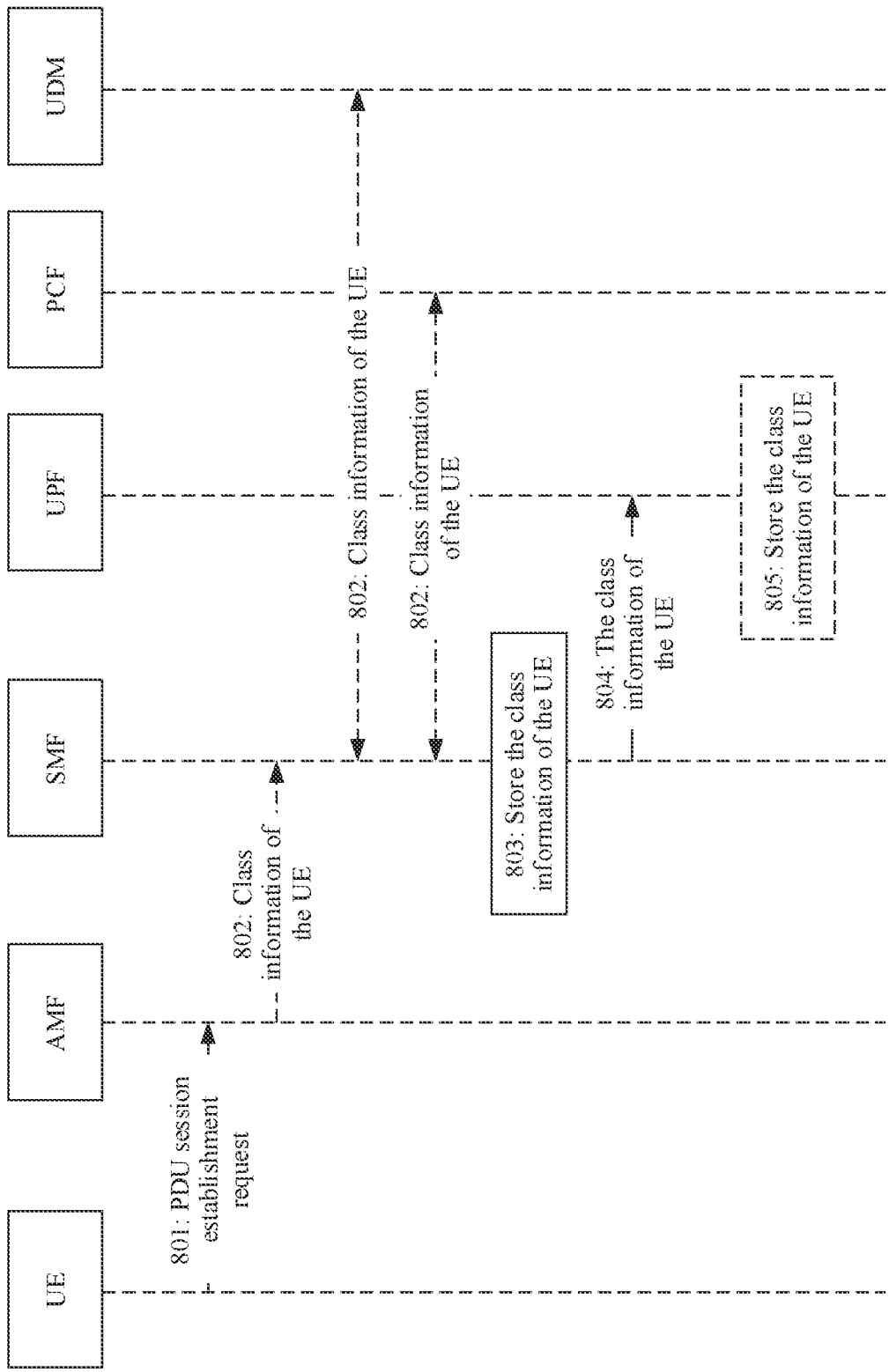
FIG. 8 is a flowchart of a method for sending class information of UE according to this application.

The following describes specific implementations in which the SMF and the UPF obtain the class information of the UE. FIG. 8 shows a method for sending class information of UE according to this application. The method includes the following steps.

Step 801: UE initiates a protocol data unit (PDU) session establishment process, and the UE sends a PDU session establishment request to an AMF.

When initiating communication, the UE needs to first initiate a registration process in FIG. 5 to FIG. 7 to establish NAS communication and, subsequently, needs to initiate a PDU session establishment process shown in FIG. 8 to request a network side to establish a communication resource for the UE. Therefore, the process occurs after the processes in FIG. 5 to FIG. 7, and a core network element (such as the AMF in FIG. 5, the PCF in FIG. 6, or the AMF and the PCF in FIG. 7) has determined class information of the UE.

Step 802: An SMF obtains the class information of the UE.

The SMF may obtain the class information of the UE in any one of the following manners.

Method 1: The SMF obtains the class information of the UE from the AMF.

The AMF may send the class information of the UE to the SMF by invoking a service interface opened by the SMF. A service provided by the SMF to the AMF may include a Create SM Context service, a SMContextStatusNotify service, and the like.

The AMF may obtain the class information of the UE by using the method according to any embodiment in FIG. 5 to FIG. 7. For example, in the case 1 described in any embodiment in FIG. 5 to FIG. 7, the AMF may obtain the class information of the UE.

Method 2: The SMF obtains the class information of the UE from a UDM.

The SMF may obtain, through querying, the class information of the UE from the UDM by invoking a service interface opened by the UDM. A service provided by the UDM to the SMF may include a subscriber data management service, a UE context management service, and the like.

The UDM may obtain the class information of the UE by using the method according to any embodiment in FIG. 5 to FIG. 7. For example, in the case 1, the case 2, or the case 3 described in any embodiment in FIG. 5 to FIG. 7, the UDM may obtain the class information of the UE.

Method 3: The SMF obtains the class information of the UE from a PCF.

The SMF may obtain, through querying, the class information of the UE from the PCF by invoking a service interface opened by the PCF. A service provided by the PCF to the SMF may include an Npcf SMPolicyControl service.

The PCF may obtain the class information of the UE by using the method according to any embodiment in FIG. 5 to FIG. 7. For example, the PCF may obtain the class information of the UE according to the case 1, the case 2, the case 3, or the case 4 in the embodiment of FIG. 5. Alternatively, the PCF may obtain the class information of the UE according to the case 1, the case 3, or the case 4 in the embodiment of FIG. 6. Alternatively, the PCF may obtain the class information of the UE according to the case 1, the case 3, or the case 4 in the embodiment of FIG. 7.

Step 803: The SMF stores the class information of the UE in a corresponding context of the UE.

This step is an optional step.

Step 804: The SMF sends the class information of the UE to a UPF.

In a PDU session establishment procedure, the SMF may allocate, according to the prior art, a UPF to a PDU session that the UE requests to establish and send the class information of the UE to the allocated UPF. For example, the SMF may send the class information of the UE to the UPF by using an N4 session establishment message or an N4 session modification request message.

Optionally, the SMF may further send an identifier of the UE to the UPF, and the identifier may be a source IP of the UE.

Step 805. The UPF stores the class information of the UE in a corresponding context of the UE.

Optionally, the UPF may further bind the class information of the UE to the identifier of the UE.

For example, the UPF may map the identifier of the UE to the class information of the UE to form a mapping table or a correspondence, for example, in a form of group 1: IP 1, IP 2, group 2: IP 3, or group 3: IP 4, IP 5.

Based on the embodiment shown in FIG. 8, in a PDU session establishment procedure of the UE, the SMF obtains the class information of the UE, and sends the class information of the UE to the UPF that serves a PDU session of the UE.

According to any one of the embodiments shown in FIG. 5 to FIG. 7 and according to the embodiment shown in FIG. 8, each network element in a network, such as the UE, the base station, the AMF, the SMF, the PCF, the UPF, or the UDM, may obtain and store the class information of the UE so that the class information of the UE can be subsequently used. For example, access of the UE is controlled based on the class information of the UE. This is described in detail in the following.

Further, because a location of the UE is movable, in an implementation, the core network element may re-determine a first class in the class information of the UE based on updated location information of the UE, or re-determine dynamic class information in the class information of the UE based on updated dynamic information of the UE.

Specifically, based on the method for determining class information of UE according to any one of the embodiments in FIG. 5 to FIG. 7, if the location information of the UE changes, the first class in the class information of the UE needs to be re-determined. The following uses the method for determining class information of UE shown in FIG. 5 as an example. When the location of the UE is updated, the first class in the class information of the UE may be re-determined according to the following method.

Figure 9:
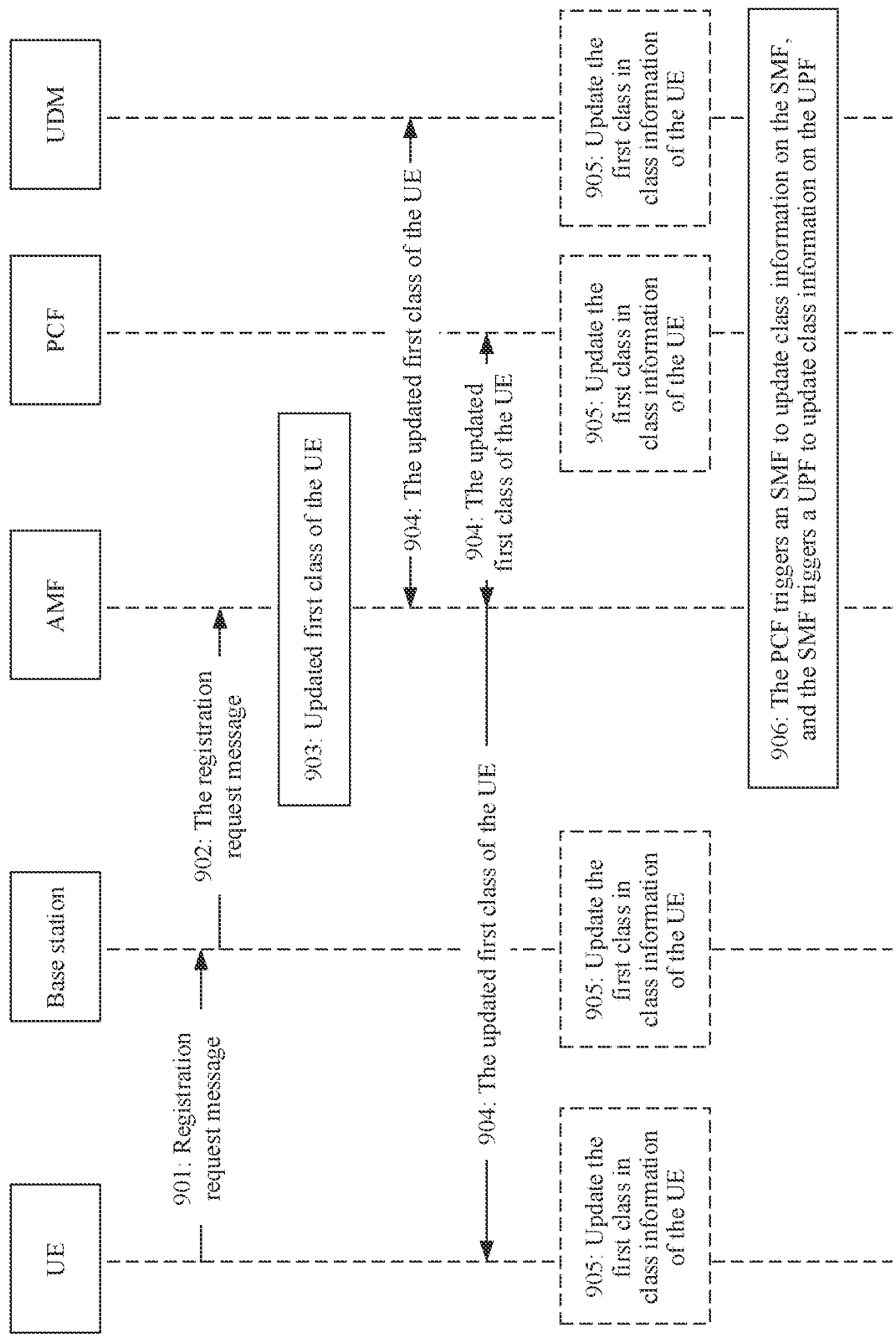
FIG. 9 is a flowchart of a method for updating class information of UE according to this application.

It should be noted that, based on the method for determining class information of UE shown in FIG. 6 or FIG. 7, when the location of the UE is updated, a method for re-determining the first class in the class information of the UE is similar to the method shown in FIG. 9. Refer to the implementations. Details are not described again.

FIG. 9 shows a method for updating class information of UE according to this application. The method includes the following steps.

Step 901: UE sends a registration request message to a base station.

Optionally, when a location of the UE is updated, the UE is triggered to send the registration request message to an AMF. The registration request message is used to update a location area, and the registration request message includes a new TAI.

The registration request message may be carried in a NAS message.

Step 902: The base station sends the registration request message to the AMF.

Step 903: The AMF updates a first class in class information of the UE.

In a specific implementation, the AMF first re-determines the first class in the class information of the UE based on new location information of the UE. If a re-determined first class is the same as the original first class of the UE, step 903 and subsequent steps related to updating the first class of the UE do not need to be performed. If a re-determined first class is different from the original first class of the UE, step 903 and subsequent steps related to updating the first class of the UE need to be performed.

Step 904: The AMF sends the updated first class of the UE to each communications device.

For example, the AMF may send the updated first class of the UE to a UDM by invoking a service interface opened by the UDM, such as a Nudm_SDM_Get service.

For example, the AMF may send the updated first class of the UE to a PCF by using a policy association establishment procedure.

For example, the AMF may send the updated first class of the UE to the base station and the UE by using a registration accept message.

In an alternative manner, step 904 may be replaced with the following: The AMF sends the updated class information to each communications device, to be specific, needs to send the updated first class and original static class information to each communications device.

Step 905: Each network element updates the first class in the class information of the UE based on the updated first class.

Step 906: The PCF triggers update of the class information on an SMF, and the SMF triggers update of the class information on a UPF.

The PCF may send the class information of the UE to the SMF by invoking a service interface opened by the SMF. A service provided by the SMF may include an Nsmf_EventExposure service. The SMF may update the first class in the class information of the UE based on the updated first class. In addition, the SMF may trigger update of the class information on the UPF.

According to the embodiment shown in FIG. 9, when the location information of the UE is updated, each communications device may update the class information of the UE.

According to the embodiments shown in FIG. 5 to FIG. 9, each communications device may obtain the class information of the UE. The following describes a method for controlling an attack behavior by a network side based on the class information of the UE when the UE is attacked. To be specific, the network side may implement access control on the UE based on the class information of the UE and at a granularity of a class of the UE.

Figure 10:
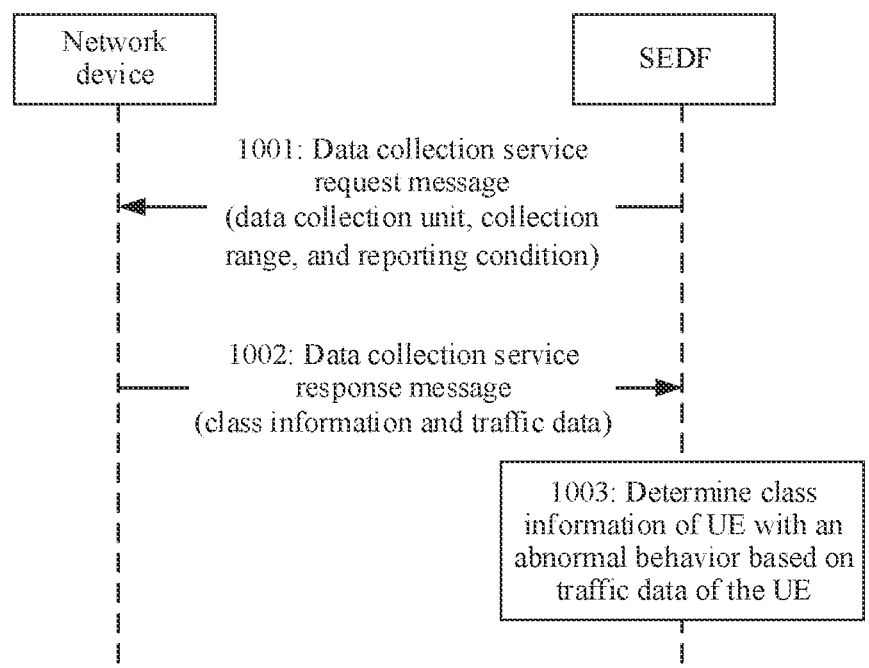
FIG. 10 is a flowchart of a method for collecting traffic of a network device according to this application.

FIG. 10 shows a method for collecting traffic of a network device according to this application. The method includes the following steps.

Step 1001: An SEDF sends a data collection service request message to a network device.

In a specific implementation, the data collection service request message sent by the SEDF may be a subscription data collection event.

The network device herein may be an AMF, an SMF, a PCF, a UPF, an AF, or the like. For example, for a network element, such as an AMF, a UDM, or a PCF, that has a service-oriented interface with the SEDF, the SEDF may invoke a data collection subscription service, that is, separately send the data collection service request message to the AMF, the UDM, and the PCF, and the message is used to request the AMF, the UDM, and the PCF to report related data information. For another example, for a network element, such as a UPF or an AF, that does not have a service-oriented interface with the SEDF, communication between the network element and the SEDF may be relayed by using a network element, such as an SMF or an NEF, that has a service-oriented interface.

The data collection service request message may include a data collection unit and a collection range. The data collection unit is configured to indicate a format of reported data, and the collection range is used to indicate a granularity at which data is collected. Herein, the collection range is performing collection based on class information. The data collection service request message may further include a reporting condition (or a trigger condition). The reporting condition is used to indicate a condition for triggering reporting of traffic data. For example, the reporting condition may be a threshold parameter or a time interval parameter. The threshold parameter is used to indicate a data indicator that meets the reporting condition. In this case, if some data indicators exceed a specified threshold, the network device needs to report data information indicated by the data collection unit. The time interval is used to indicate a time interval of periodic data reporting. In this case, the network device reports, at certain time intervals, the data information indicated by the data collection unit.

Step 1002: The network device collects the traffic data, and sends a data collection service response message to the SEDF.

The data collection service response message includes class information and the traffic data corresponding to the class information, and the traffic data of UE indicated by the class information meets the reporting condition.

For example, if the network device is a UPF, the data collection unit instructs to collect information such as a quantity of flows, an average packet size, a packet size variance, and an average packet interval of user plane traffic of a destination IP in a unit time, the collection range instructs to perform collection based on all class information, and the reporting condition is a time interval whose value is T. In this case, the UPF periodically collects statistics on user plane information of all the class information. For example, if the UPF has information about 100 classes in total (note that the information about the 100 classes may be in a form of types, or may be in a form of {type1, type2}, or may be in a form of {type1, type2, type3, type4}), the UPF collects statistics on the information about the 100 classes every period of time of T to obtain information such as a quantity of flows, an average packet size, a packet size variance, and an average packet interval that are of different destination IPs in a unit time and that correspond to the 100 classes and sends a data collection service response message to the SEDF, where the data collection service response message includes the class information and traffic data corresponding to the class information.

It should be noted that, the network device may obtain the class information of the UE by using the method according to any embodiment shown in FIG. 5 to FIG. 7 so that the traffic data can be reported based on the class information. For example, for the network device that receives the data collection service request message from the SEDF, if the network device has obtained the class information of the UE, the network device may directly report the traffic data based on the class information. Certainly, for the network device that receives the data collection service request message from the SEDF, if the network device does not have the class information of the UE, the network device may obtain the class information of the UE from another network device that has the class information of the UE.

For another example, if the network element is an AMF, the data collection unit instructs to collect information such as a quantity of flows and an average packet interval of control plane traffic in a unit time, the collection range instructs to perform collection based on all class information, and a reporting condition is threshold triggering. For example, an event is triggered when the quantity of flows in the unit time exceeds a threshold A. In this case, the AMF periodically collects statistics on control plane information of all the class information. For example, if the AMF has information about 100 classes in total, the AMF collects statistics on the information about the 100 classes in real time. When a quantity of flows of information about a specific class in a unit time exceeds the threshold A, the AMF sends a data collection service response message to the SEDF, and the data collection service response message includes the class information and traffic data corresponding to the class information.

A specific implementation in which the network device reports the class information and the traffic data corresponding to the class information may be, for example, for the network device, such as an AMF or a UDM, that has a service-oriented interface with the SEDF, the network device may directly report the class information and the corresponding traffic data to the SEDF by invoking a prompt function of a data collection service. For the network element, such as a UPF or an AF, that does not have a service-oriented interface with the SEDF, communication between the network element and the SEDF may be relayed by using the network element, such as an SMF or an NEF, that has a service-oriented interface, in other words, the class information and traffic data corresponding to the class information is reported.

It should be noted that, the network device may obtain the class information of the UE by using the method according to any embodiment shown in FIG. 5 to FIG. 7 so that the traffic data can be reported based on the class information. For example, for the network device that receives the data collection service request message from the SEDF, if the network device has obtained the class information of the UE, for example, as shown in the case 1 or the case 3 in FIG. 5 to FIG. 7, the network device may directly report the traffic data based on the class information. Certainly, for the network device that receives the data collection service request message from the SEDF, if the network device does not have the class information of the UE, for example, as shown in the case 2 in FIG. 5 to FIG. 7, the network device may obtain the class information of the UE from another network device that has the class information of the UE.

Step 1003: The SEDF determines abnormal class information based on the traffic data of the UE.

For example, the SEDF detects, based on a security detection algorithm, the traffic data corresponding to the class information, to determine the abnormal class information.

In an example, when a DDoS attack against an external AF occurs, a large amount of traffic simultaneously accesses a same destination address. The traffic has similar features and probably belongs to a same class, because an attacker usually attacks devices of a same type. In this case, data such as a quantity of access flows, an average packet size, a packet size variance, and an average packet interval of a target indicated by the destination address in a unit time is abnormal. For example, the quantity of access flows in the unit time sharply increases compared with that in a normal period of time. This is caused by a characteristic of the DDoS attack. The average packet size in the unit time decreases compared with that in a normal period of time. This is caused by a large quantity of same user-plane attack packets. The packet size variance in the unit time increasingly approaches 0. This is caused by a large quantity of same user-plane attack packets. The average packet interval in the unit time decreases compared with that in a normal period of time. This is caused by a large quantity of high-speed user-plane attack packets. Therefore, these parameters may be used as input features for detecting a DDoS attack. After these parameters are input into the SEDF, whether a combination of the data information is abnormal may be obtained by using the security detection algorithm (for example, a machine learning algorithm). Therefore, whether class information corresponding to the data information is abnormal may be obtained. In other words, class information that indicates a terminal that causes the attack is identified.

In another example, when a DDoS attack against an internal AMF or a UDM occurs, a large amount of traffic simultaneously accesses a same AMF or UDM. Because the traffic is a signaling message, statistics on a packet size and a packet variance does not need to be collected. Because NAS messages have nearly same lengths, only statistics on information such as a quantity of flows and an average packet interval in a unit time needs to be collected. For example, a quantity of flows accessing the AMF or the UDM in the unit time sharply increases compared with that in a normal period of time. This caused by a characteristic of the DDoS attack. The average packet interval in the unit time decreases compared with a normal period of time. This is caused by a large quantity of high-speed control plane attack packets. Therefore, these parameters may be used as input features for detecting a DDoS attack. After the quantity of flows accessing the AMF or the UDM in the unit time exceeds a threshold, the AMF or the UDM reports the parameters to the SEDF. After these parameters are input into the SEDF, whether a combination of the data information is abnormal may be obtained by using the security detection algorithm (for example, a machine learning algorithm). Therefore, whether class information corresponding to the data information is abnormal may be obtained. In other words, class information that indicates a terminal that causes the attack is identified.

According to the embodiment shown in FIG. 10, the SEDF implements a procedure of analyzing a security threat at a granularity of the class information based on the class information and the data information. An analysis speed is faster and signaling interaction is less than that of analysis at a UE level.

It should be noted that, after determining the abnormal class information, the SEDF may send the abnormal class information so that a network element that receives the abnormal class information can control access of the UE based on the abnormal class information. The following provides different implementations of controlling access of UE.

Figure 11:
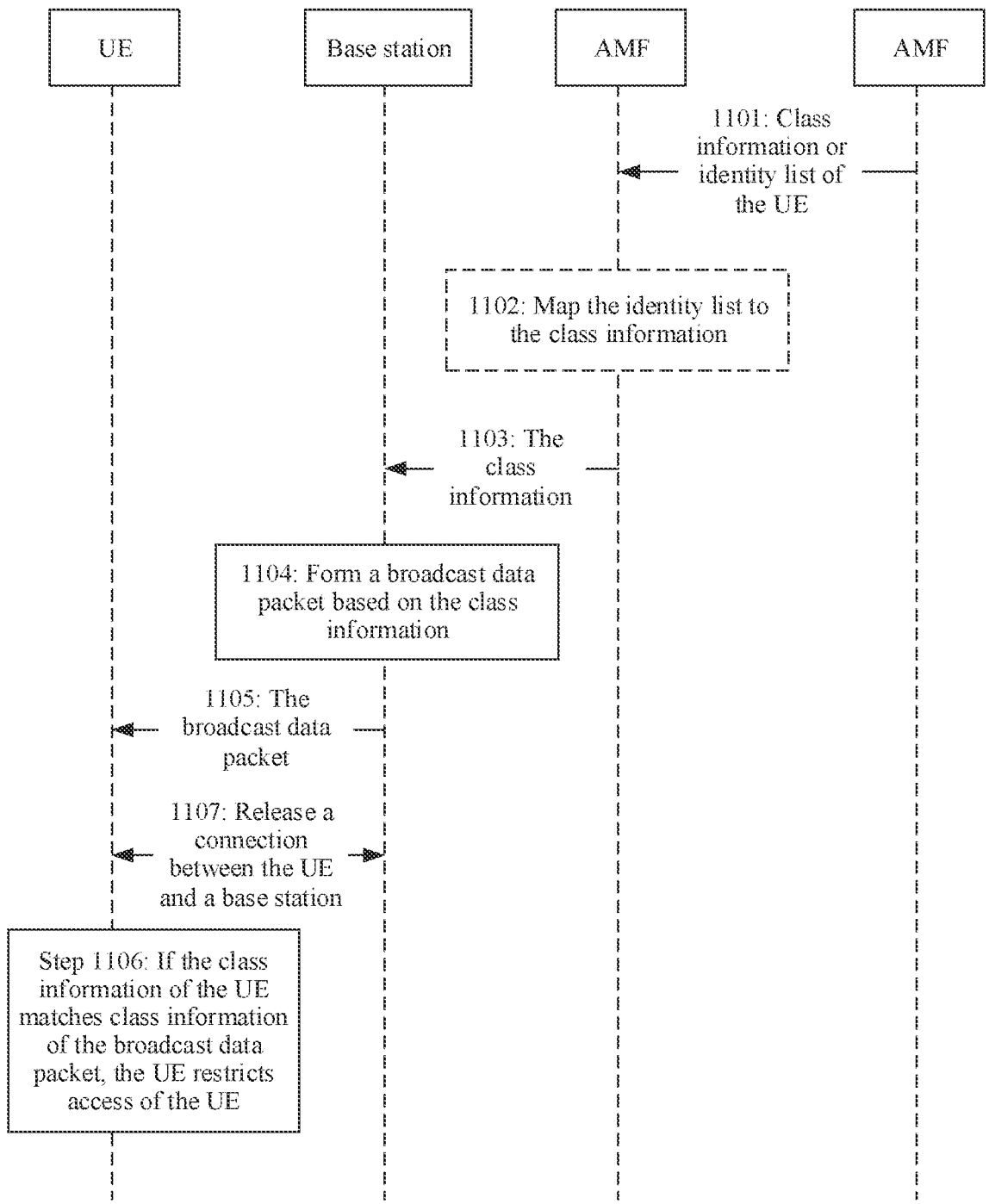
FIG. 11 is a flowchart of a method for controlling access of UE according to this application.

FIG. 11 shows a method for controlling access of UE according to this application. In the method, UE with an abnormal behavior is controlled by using a control plane. The method includes the following steps.

Step 1101: An SEDF detects abnormal UE (that is, UE with an abnormal behavior), and outputs an identifier of the abnormal UE. The identifier of the abnormal UE may be abnormal class information, or may be an identity list of the abnormal UE, such as a subscription permanent identifier (SUPI) list. The SEDF may notify an AMF or a PCF of the identifier of the abnormal UE.

In an implementation, the SEDF sends the abnormal class information to the AMF. For example, the SEDF may detect one or more pieces of abnormal class information in a manner of the embodiment shown in FIG. 10. Therefore, in an implementation, the SEDF may send all the detected abnormal class information to the AMF, and the AMF performs, based on the abnormal class information, access control on a terminal matching the abnormal class information. In another implementation, the SEDF may send only some of the obtained abnormal class information in all class information to the AMF. For example, if 100 pieces of abnormal class information are obtained, the SEDF may send, to the AMF based on a preset percentage such as 30%, first 30% pieces of abnormal class information that include a largest quantity of UEs in the 100 pieces of abnormal class information, or send, to the AMF based on a preset fixed quantity such as 50, first 50 pieces of abnormal class information that include a largest quantity of UEs in the 100 pieces of abnormal class information, and the AMF performs, based on the abnormal class information, access control on a terminal matching the abnormal class information.

In another implementation, the SEDF sends the identity list of the abnormal UE, such as the SUPI list, to the PCF. The PCF obtains one or more pieces of abnormal class information through mapping based on the SUPI list, and then the PCF sends the abnormal class information to the AMF.

In another implementation, the SEDF sends the identity list of the abnormal UE, such as the SUPI list, to the AMF. The AMF obtains one or more pieces of abnormal class information through mapping based on the SUPI list. It should be noted that the SEDF may obtain the identity list of the abnormal UE at a granularity of the UE (per UE) according to the method in the prior art.

Step 1102: The AMF or the PCF maps an identity list to class information.

This step is an optional step. When the SEDF sends the identity list of the UE to the PCF in step 1101, step 1102 is performed.

Optionally, that the AMF or the PCF maps the identity list to the class information may be specifically determining information about a class to which each terminal belongs in the identity list, and determining abnormal class information based on the information about the class to which each terminal belongs in the identity list. The determining abnormal class information may include the following implementations.

In an implementation, when the AMF or the PCF maps one or more classes to the SUPI list, the AMF or the PCF may determine the abnormal class information based on a local policy. The local policy may include an absolute policy and a relative policy. In the absolute policy, it may be determined, based on a preset absolute threshold, whether to ouatput corresponding class information as abnormal class information. For example, 100 SUPIs are obtained, where 60 SUPIs belong to a class A, 30 SUPIs belong to a class B. and 10 SUPIs belong to a class C. An administrator sets the absolute threshold to 30. Because both a quantity of SUPIs of the class A and a quantity of SUPIs of the class B are greater than or equal to 30, it is finally determined that the class A and the class B are abnormal class information. Because a quantity of SUPIs of the class C is less than the absolute threshold, it is determined that the class C is not output as abnormal class information. In this example, the class A, the class B, and the class C are candidate abnormal class information, and the class A and the class B are output abnormal class information. In the relative policy, it may be determined, based on a relative percentage of output information, whether to output corresponding class information as abnormal class information. For example, 100 SUPIs are obtained, where 60 SUPIs belong to a class A, 30 SUPIs belong to a class B, and 10 SUPIs belong to a class C. An administrator sets the relative percentage to 30%. Because a percentage of either of a quantity of SUPIs of the class A and a quantity of SUPIs of the class B in a total quantity of SUPIs is greater than or equal to 30%, it is finally determined that the class A and the class B are abnormal class information. Because a percentage of a quantity of SUPIs of the class C in the total quantity of SUPIs is less than 30%, it is determined that the class C is not output as abnormal class information. In this example, the class A, the class B, and the class C are candidate abnormal class information, and the class A and the class B are output abnormal class information.

In another implementation, the AMF or the PCF may determine, based on the identity list and a correspondence between the class information of the terminal and the identifier of the terminal, candidate abnormal class information corresponding to the identity list, where terminals having same class information in the identity list correspond to same candidate abnormal class information, and for each piece of candidate abnormal class information, determine that the candidate abnormal class information is the abnormal class information if a percentage of a quantity of terminals belonging to the candidate abnormal class information in a quantity of all terminals corresponding to the candidate abnormal class information in the identity list is greater than a preset percentage threshold. For example, the identity list includes 100 SUPIs, the 100 SUPIs are mapped to information about three candidate abnormal classes, respectively, a class A, a class B, and a class C. A quantity of abnormal UEs corresponding to the class A is 30, a quantity of abnormal UEs corresponding to the class B is 30, a quantity of abnormal UEs corresponding to the class C is 40, and the preset percentage threshold is 40%. In addition, if the AMF or the PCF determines that a quantity of all UEs belonging to the class A is 100, a quantity of all UEs belonging to the class B is 50, and a quantity of all UEs belonging to the class C is 80, a percentage of the quantity of abnormal UEs of the class A is 30/100

30%, a percentage of the quantity of abnormal UEs of the class B is 30/50

60%, and a percentage of the quantity of abnormal UEs of the class C is 40/80

50%. Both 60% and 50% are greater than the percentage threshold 40%. Therefore, it can be determined that both the class B and the class C are abnormal class information.

Step 1103: The AMF sends the class information to a base station, to instruct the base station to restrict access of the terminal based on the class information.

The AMF may determine, based on the local policy, to restrict access of the terminal based on the class information, or the AMF may restrict access of the terminal based on the class information based on a notification from another network element (such as a PCF or an SEDF).

The class information is used to indicate the UE with the abnormal behavior.

Optionally, the AMF may further send a restriction indication to the base station, and the restriction indication is used to instruct the base station to restrict access of the terminal based on the class information.

Optionally, the AMF further sends a timer to the base station, and the timer is used to instruct to restrict an expiration time.

Step 1104: The base station constructs a broadcast data packet based on the class information, where the broadcast data packet includes the following parameters.

a. Restriction Factor.

The restriction factor may also be referred to as a restriction indication and is used to restrict access of the UE matching the class information. In a specific implementation, the restriction factor may be similar to ac-BarringFactor in the embodiment shown in FIG. 3.

b. Restriction Time (Optional).

In a specific implementation, the restriction time may be similar to ac-BarringTime in the embodiment shown in FIG. 3.

c. Class Information.

The class information is obtained by the base station from the AMF. The class information may include information about one or more classes. For example, if a plurality of pieces of abnormal class information are determined in step 1102, the broadcast data packet sent by the base station to the UE may include the plurality of pieces of abnormal class information.

Step 1105: The base station sends the broadcast data packet.

Optionally, the base station may further store a timer. The timer may be generated by the base station based on a policy, or may be provided by the SEDF or the AMF.

After receiving the class information, the base station starts the timer. If the timer does not expire, the base station sends the broadcast data packet in a broadcast manner. When the timer expires, the base station stops sending the broadcast data packet.

Step 1106: All UEs served by the base station receive the broadcast data packet, and if the class information of the UE matches class information in the broadcast data packet, the UE restricts access of the UE.

For example, if class information stored in UE is (C11, C22), the class information included in the broadcast data packet sent by the base station is a class (C11, C22; C12, C21). Because the class information included in the broadcast data packet includes the class information stored in the UE, the class information of the UE matches the class information in the broadcast data packet, the UE restricts access of the UE.

For another example, if class information stored in UE is (C12, C22), the class information included in the broadcast data packet sent by the base station is a class (C11, C22; C12, C21). Because the class information included in the broadcast data packet does not include the class information stored in the UE, the class information of the UE does not match the class information in the broadcast data packet, the UE does not restrict access of the UE.

A specific implementation method for restricting access of the UE by the UE may be the same as the method for restricting access of the UE by the UE in the embodiment shown in FIG. 3. In other words, ac-BarringFactor is a value ranging from 0 to 1. Each time before attempting to access the base station, the UE first generates a random number ranging from 0 to 1. If the generated random number is less than ac-BarnngFactor, the UE can directly access the base station. Otherwise, the UE does not access the base station and waits for a period of time before attempting to access the base station again. ac-BarringTime is used to indicate a time for barring access. When the UE decides not to access the base station, the UE waits for a time of ac-BarringTime.

Step 1107: Release a connection between the UE and the base station.

This step is an optional step.

In an implementation, when determining to restrict access of the UE, the UE may actively release the connection between the UE and the base station.

In another implementation, the base station may further determine, based on the class information of the UE, that the UE is UE whose access needs to be restricted, and the base station releases the connection between the base station and the UE having the corresponding class information. For example, the base station may send a release message to the corresponding UE, and the release message may include a cause value, and the cause value may indicate that the UE is released due to a security cause. When receiving the release message with the cause value, the UE may wait for a period of time and then attempt to initiate a connection again. In this case, the base station needs to store the class information of the UE in context information of the UE in advance. The class information may be carried in a radio resource control (RRC) message when the UE is connected to the base station and obtained by the base station, or may be provided by a network side to the base station through an SI connection or an N2 connection when the base station interacts with a network side (for example, as shown in the embodiments shown in FIG. 5 to FIG. 7) or provided by another base station when X2 or Xn interaction is performed between base stations.

It should be noted that the PCF or the AMF may obtain the class information of the UE by using the method according to any embodiment shown in FIG. 5 to FIG. 7 so that the PCF or the AMF can map the received identity list (that is, identifiers of one or more UEs) to the class information of the UE. For example, if the PCF or the AMF has obtained the class information of the UE, for example, as shown in the case 1 or the case 3 in FIG. 5 to FIG. 7, the PCF or the AMF stores contexts of a plurality of UEs, and a context of one UE stores class information of the UE and an identifier of the UE so that after receiving the identity list, the PCF or the AMF can obtain class information corresponding to the identity list. Certainly, if the PCF or the AMF does not have the class information of the UE, for example, as shown in the case 2 in FIG. 5 to FIG. 7, the PCF or the AMF may send the identity list to another network device that has the class information of the UE, and then receive the class information of the UE from the another network device that has the class information of the UE.

It should be noted that the UE or the base station may obtain the class information of the UE by using the method according to any embodiment shown in FIG. 5 to FIG. 7 so that the UE or the base station can restrict access of the terminal based on the received class information. For example, the UE or the base station may already obtain the class information of the UE according to the case 4 in FIG. 5 to FIG. 7.

According to the embodiment shown in FIG. 11, the SEDF instructs to implement, based on the class information, a procedure of controlling access of the UE at a granularity of the class information. Compared with an existing solution of controlling access of UE at a granularity of the UE, a function of controlling access of a plurality of UEs at a time can be implemented, and control signaling is reduced. Further, a timer may be added, to provide a false-alarm self-recovery manner, and prevent the UE from being prevented from accessing a network for a long time. In addition, the base station may release the connection between the base station and the UE, to implement a function of controlling the UE in a connected state.

Figure 12:
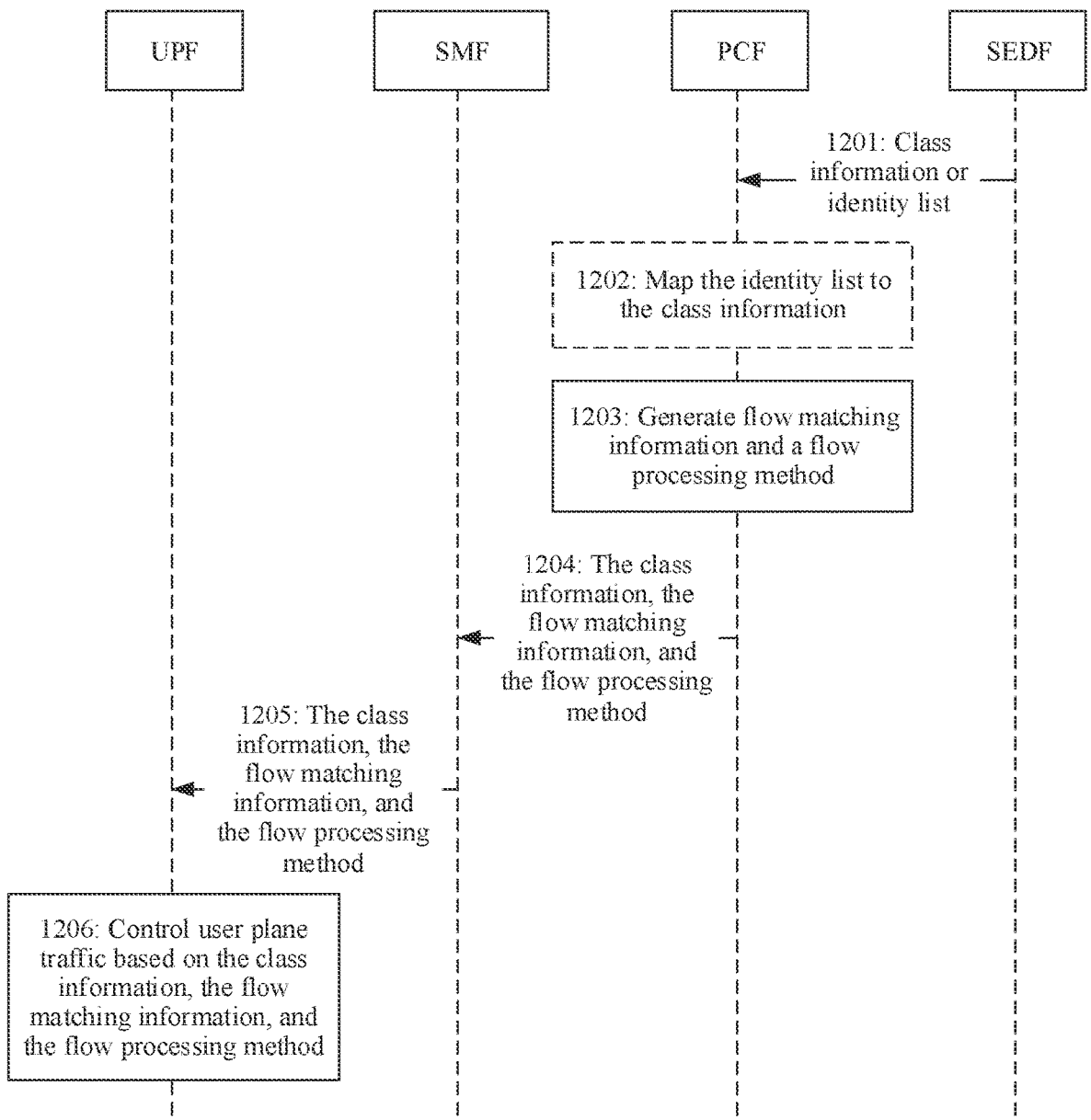
FIG. 12 is a flowchart of another method for controlling access of UE according to this application.

FIG. 12 shows another method for controlling access of UE according to this application. In the method, UE with an abnormal behavior is controlled by using a user plane. The method includes the following steps.

Step 1201: An SEDF detects abnormal UE (that is, UE with an abnormal behavior), and outputs an identifier of the abnormal UE. The identifier of the UE may be abnormal class information, or may be an identity list of the abnormal UE, such as an SUPI list. The SEDF may notify an AMF or a PCF of the identifier of the abnormal UE.

In an implementation, the SEDF sends the abnormal class information to the PCF. For a specific implementation, refer to related descriptions of step 1101 in the embodiment shown in FIG. 11.

In another implementation, the SEDF sends the identity list of the abnormal UE, such as the SUPI list, to the PCF. The PCF obtains one or more pieces of abnormal class information through mapping based on the SUPI list. It should be noted that the SEDF may obtain the identity list of the abnormal UE at a granularity of the UE (per UE) according to the method in the prior art. For a specific implementation, refer to related descriptions in step 1101 in the embodiment shown in FIG. 11.

Optionally, the SEDF further sends a victim ID to the PCF, to identify an attacked target. For example, the victim ID may be an IP address, a port number, or the like.

Step 1202: The PCF maps an identity list to class information.

This step is an optional step. When the SEDF sends the identity list of the UE to the PCF in step 1201, step 1202 is performed.

For a specific implementation in which the PCF maps the identity list to the class information, refer to related descriptions in step 1102 in the embodiment in FIG. 11.

Step 1203: The PCF generates flow matching information and a flow processing method, to control the UE with the abnormal behavior.

The PCF may determine, based on a local policy, to generate the flow matching information and the flow processing method based on the class information, or the PCF may generate the flow matching information and the flow processing method based on a notification of another network element (such as the SEDF). The flow matching information is used to match user plane traffic, and may include a flow 5-tuple, such as a source IP address, a source port, a destination IP address, a target port, and a protocol type. The flow processing method is used to control the user plane traffic that matches the flow matching information and that is sent by UE matching the class information. The class information is obtained from the SEDF, or is obtained through mapping by the PCF.

Optionally, the flow matching information may be generated based on the victim ID. For example, when the victim ID is an IP address and a port number, flow matching information in which a source IP address is a wildcard, a source port is a wildcard, a destination IP address is an IP address of a victim, a target port is a port number of the victim, and a protocol type is a wildcard.

In an implementation, the PCF may generate a control policy, and the control policy includes the flow matching information and the flow processing method. The control policy may be a special policy and charging control (PCC) rule. For example, the PCF generates a PCC rule including relatively low quality of service (QoS) and a flow matching template, to instruct a UPF to perform corresponding QoS control if a current flow is sent by UE belonging to class information when the UPF matches the flow matching template. Alternatively, the PCF generates a PCC rule that includes a gate and a flow matching template, to instruct a UPF to discard related traffic if a current flow is sent by the UE belonging to the class information when the UPF matches the flow matching template. The flow matching template may be used to identify access traffic of the victim ID. In this way, overall traffic corresponding to the entire class information may be controlled on the UPF. Optionally, the control policy may further include the class information.

Step 1204: The PCF sends the class information, the flow matching information, and the flow processing method to the SMF.

In an implementation, the PCF sends the class information and the control policy to the SMF, and the control policy includes the flow matching information and the flow processing method.

In an implementation, the PCF sends the control policy to the SMF, and the control policy includes the class information, the flow matching information, and the flow processing method.

Optionally, the PCF further sends a timer to the SMF.

Step 1205: The SMF sends the class information, the flow matching information, and the flow processing method to the UPF.

In an implementation, the SMF sends the class information and the control policy to the UPF, and the control policy includes the flow matching information and the flow processing method.

In an implementation, the SMF sends the control policy to the UPF, and the control policy includes the class information, the flow matching information, and the flow processing method.

Optionally, the SMF further sends a timer to the UPF.

Step 1206: The UPF controls the user plane traffic based on the class information, the flow matching information, and the flow processing method.

The UPF monitors the user plane traffic. When the traffic matches the flow matching information and the traffic belongs to the UE corresponding to the class information, the UPF executes the control instruction based on the flow processing method. If the flow processing method includes a discard operation, the UPF discards the user plane traffic. If the flow processing method includes a quality-of-service modification operation, the UPF modifies quality of service of the user plane traffic.

For example, the UPF stores a correspondence between the source IP address and the class information in a locally stored mapping table, and one source IP address is used to identify one UE. When the destination IP address of the user plane traffic matches the destination IP address in the flow matching information, the UPF checks the source IP address, and obtains class information of the source IP address based on the mapping table. If the class information corresponding to the source IP address matches the received class information, the UPF performs a corresponding flow processing method, for example, discards the user plane traffic.

Optionally, the UPF may further store a timer. The timer may be generated by the UPF based on a policy, or may be provided by the SEDF or the PCF. The timer is used to indicate a time for performing control of the user plane traffic.

It should be noted that the PCF may obtain the class information of the UE by using the method according to any embodiment shown in FIG. 5 to FIG. 7 so that the PCF can map the received identity list (that is, identifiers of one or more UEs) to the class information of the UE. For example, if the PCF has obtained the class information of the UE, for example, as shown in the case 1 or the case 3 in FIG. 5 to FIG. 7, the PCF stores contexts of a plurality of UEs, and a context of one UE stores class information of the UE and an identifier of the UE so that after receiving the identity list, the PCF can obtain class information corresponding to the identity list. Certainly, if the PCF does not have the class information of the UE, for example, as shown in the case 2 in FIG. 5 to FIG. 7, the PCF may send the identity list to another network device that has the class information of the UE, and then receive the class information of the UE from the another network device that has the class information of the UE.

It should be noted that the SMF or the UPF may obtain the class information of the UE by using the method shown in FIG. 8 so that the SMF or the UPF can restrict access of a terminal based on the received class information.

According to the embodiment shown in FIG. 12, the SEDF instructs the PCF to implement, based on the class information, a procedure of restricting access of the UE at a granularity of the class information. Compared with an existing solution of performing control at a granularity of the UE, in this solution, traffic of a plurality of UEs can be controlled at a time, control signaling is reduced, a quantity of policies on the UPF is reduced, and an abnormal class can also be accurately controlled. Further, a timer may be added, to provide a false-alarm self-recovery manner, and prevent the UE from being prevented from accessing a network for a long time.

The solutions provided in this application are described above mainly from a perspective of interaction between network elements. It may be understood that, the network elements include corresponding hardware structures and/or software modules for performing the foregoing functions. A person skilled in the art should be easily aware that, in combination with the examples described in the embodiments disclosed in this specification, units and algorithm steps can be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 13:
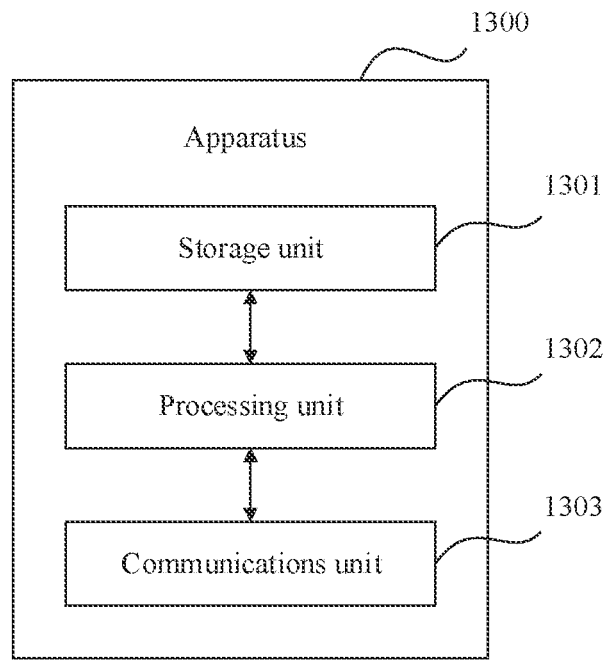
FIG. 13 is a schematic diagram of an apparatus according to this application.

When an integrated unit is used. FIG. 13 is a possible example block diagram of an apparatus according to an embodiment of the present invention. The apparatus 1300 may exist in a form of software, or may exist in a form of hardware, or may exist in a form of software and hardware. This is not limited in this embodiment of this application. The apparatus 1300 may include a processing unit 1302 and a communications unit 1303. In an implementation, the communications unit 1303 may include a receiving unit and a sending unit. The processing unit 1302 is configured to control and manage an action of the apparatus 1300. The communications unit 1303 is configured to support the apparatus 1300 in communicating with another network entity. The apparatus 1300 may further include a storage unit 1301, configured to store program code and data of the apparatus 1300.

The processing unit 1302 may be a processor or a controller, such as a general-purpose central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processing unit 1302 may implement or execute various example logical blocks, modules, and circuits described with reference to content disclosed in the embodiments of the present invention. Alternatively, the processing unit 1302 may be a combination of processors implementing a computing function, for example, a combination of one or more microprocessors, or a combination of the DSP and a microprocessor. The communications unit 1303 may be a communications interface, a transceiver, a transceiver circuit, or the like. The communications interface is a general term. In a specific implementation, the communications interface may include a plurality of interfaces. The storage unit 1301 may be a memory.

In a first application, the apparatus 1300 may be the access network device in any one of the foregoing embodiments, or may be a chip in the access network device. For example, when the apparatus 1300 is the access network device, the processing unit 1302 may be, for example, a processor, the communications unit may be, for example, a transceiver, and the transceiver includes a radio frequency circuit. Optionally, the storage unit may be, for example, a memory. For example, when the apparatus 1300 is the chip in the access network device, the processing unit 1302 may be, for example, a processor, and the communications unit may be, for example, an input/output interface, a pin, a circuit, or the like. The processing unit 1302 may execute a computer execution instruction stored in the storage unit. Optionally, the storage unit is a storage unit in the chip, such as a register or a cache. Alternatively, the storage unit may be a storage unit that is in the access network device and that is located outside the chip, such as a read-only memory (ROM) or another type of static storage device that can store static information and an instruction, or a random access memory (RAM).

Specifically, when the communications unit 1303 includes a sending unit and a receiving unit, the receiving unit is configured to receive abnormal class information from a core network element, and the sending unit is configured to send a broadcast data packet, where the broadcast data packet includes abnormal class information, and the broadcast data packet is used to restrict access of a terminal that matches the abnormal class information.

In a possible implementation, the receiving unit is further configured to: receive, before the sending unit sends the broadcast data packet, a restriction indication from the core network element, where the restriction indication is used to instruct to restrict, based on the restriction indication, access of the terminal matching the abnormal class information.

In a possible implementation, the processing unit is further configured to start a timer after the receiving unit receives the abnormal class information. The sending unit is specifically configured to send the broadcast data packet if the timer does not expire.

In a second application, the apparatus 1300 may be the terminal in any one of the foregoing embodiments, or may be a chip in the terminal. For example, when the apparatus 1300 may be the terminal, the processing unit 1302 may be, for example, a processor, the communications unit may be, for example, a transceiver, and the transceiver includes a radio frequency circuit. Optionally, the storage unit may be, for example, a memory. For example, when the apparatus 1300 may be the chip in the terminal, the processing unit 1302 may be, for example, a processor, and the communications unit may be, for example, an input/output interface, a pin, a circuit, or the like. Optionally, the storage unit is a storage unit inside the chip, such as a register or a cache. Alternatively, the storage unit may be a storage unit that is inside the terminal and that is located outside the chip, such as a ROM, another type of static storage device that can store static information and instructions, or a RAM.

Specifically, when the communications unit 1303 includes a sending unit and a receiving unit, the receiving unit is configured to receive broadcast information from an access network device, where the broadcast information includes abnormal class information, and the broadcast data packet is used to restrict access of a terminal that matches the abnormal class information. The processing unit is configured to: if the class information of the terminal matches the received abnormal class information, restrict access of the terminal, where the class information of the terminal is received by the terminal from a core network element.

In a possible implementation, the receiving unit is further configured to receive the class information of the terminal from the core network element, where the class information of the terminal is generated based on information about the terminal, and the information about the terminal includes some or all of the following information:
  function information of the terminal, where the function information is used to indicate capability information of the terminal;
  user information of the terminal, where the user information is used to indicate owner information of the terminal,
  device information of the terminal, where the device information is used to indicate manufacturing information of the terminal; and
  location information of the terminal, where the location information is used to indicate a location of the terminal.

In a possible implementation, the processing unit is further configured to release a connection to the access network device.

In a third application, the apparatus 1300 may be the core network element in any one of the foregoing embodiments, or may be a chip in the core network element. The core network element herein may be a mobility management network element or a policy control network element. For example, when the apparatus 1300 may be the core network element, the processing unit 1302 may be, for example, a processor, the communications unit may be, for example, a transceiver, and the transceiver includes a radio frequency circuit. Optionally, the storage unit may be, for example, a memory. For example, when the apparatus 1300 may be the chip in the core network element, the processing unit 1302 may be, for example, a processor, and the communications unit may be, for example, an input/output interface, a pin, a circuit, or the like. Optionally, the storage unit is a storage unit inside the chip, such as a register or a cache. Alternatively, the storage unit may be a storage unit that is inside the core network element and that is located outside the chip, such as a ROM, another type of static storage device that can store static information and instructions, or a RAM.

Specifically, when the communications unit 1303 includes a sending unit and a receiving unit, the processing unit is configured to obtain, for N terminals that access a network, information about the N terminals, where N is a positive integer, and information about a terminal includes some or all of the following information:
  function information of the terminal, where the function information is used to indicate capability information of the terminal;
  user information of the terminal, where the user information is used to indicate owner information of the terminal;
  device information of the terminal, where the device information is used to indicate manufacturing information of the terminal; and
  location information of the terminal, where the location information is used to indicate a location of the terminal; and
  the processing unit is further configured to determine, for each terminal in the N terminals, class information of the terminal based on information about the terminal.

In a possible implementation, the function information of the terminal includes some or all of the following parameters; a network capability, a mobile station network capability, a mobile station classmask 2, a mobile station classmask 3, supported coding, an added update class, a voice domain preference, a usage setting of the terminal, device performance of the terminal, and a mobile station-supported network feature, the user information of the terminal includes some or all of the following parameters: a group identifier, an administrator identifier, and a company identifier, and the device information of the terminal includes some or all of the following parameters: a type allocation code and a software version of an equipment identification code of the terminal.

In a possible implementation, that the processing unit is configured to determine class information of the terminal based on information about the terminal specifically includes: determining a first class in the class information of the terminal based on location information of the terminal; and determining a second class in the class information of the terminal based on some or all of the function information, the user information, or the device information of the terminal.

In a possible implementation, the processing unit is further configured to update, if the location information of the terminal is updated, the first class in the class information of the terminal based on updated location information.

In a possible implementation, the sending unit is configured to send the class information of the terminal to a communications device, where the communications device includes some or all of the following devices: the terminal, an access network device, a mobility management network element, a session management network element, a policy control network element, and a user plane network element.

In a possible implementation, the receiving unit is configured to receive indication information, where the indication information is used to instruct to determine the class information of the terminal.

In a possible implementation, the core network element is a policy control network element, and the policy control network element includes a storage unit, configured to store, for each terminal in the N terminals, a correspondence between the class information of the terminal and an identifier of the terminal.

In a fourth application, the apparatus 1300 may be the policy control network element in any one of the foregoing embodiments, or may be a chip in the policy control network element. For example, when the apparatus 1300 may be the policy control network element, the processing unit 1302 may be, for example, a processor, the communications unit may be, for example, a transceiver, and the transceiver includes a radio frequency circuit. Optionally, the storage unit may be, for example, a memory. For example, when the apparatus 1300 may be the chip in the policy control network element, the processing unit 1302 may be, for example, a processor, and the communications unit may be, for example, an input/output interface, a pin, a circuit, or the like. Optionally, the storage unit is a storage unit inside the chip, such as a register or a cache. Alternatively, the storage unit may be a storage unit that is inside the policy control network element and that is located outside the chip, such as a ROM, another type of static storage device that can store static information and instructions, or a RAM.

Specifically, when the communications unit 1303 includes a sending unit and a receiving unit, the receiving unit is configured to receive an identity list of abnormal terminals from a security detection network element, where the identity list is used to indicate one or more abnormal terminals, and the processing unit is configured to determine abnormal class information based on a local policy, the identity list, and the correspondence between the class information of the terminal and the identifier of the terminal, and the sending unit is configured to send the abnormal class information.

In a possible implementation, the processing unit is specifically configured to:
  determine, based on the identity list and the correspondence between the class information of the terminal and the identifier of the terminal, candidate abnormal class information corresponding to the identity list, where terminals having same class information in the identity list correspond to same candidate abnormal class information; and
  determine, for each piece of candidate abnormal class information, that the candidate abnormal class information is the abnormal class information if a percentage of a quantity of terminals belonging to the candidate abnormal class information in a quantity of all terminals corresponding to the candidate abnormal class information in the identity list is greater than a preset percentage threshold; or
  determine, for each piece of candidate abnormal class information, that the candidate abnormal class information is the abnormal class information if a quantity of terminals belonging to the candidate abnormal class information in the identity list is greater than a preset quantity threshold.

In a possible implementation, the sending unit is specifically configured to send the abnormal class information to the access network device.

In a possible implementation, the sending unit is specifically configured to send the abnormal class information to a user plane network element; and the sending unit is further configured to send flow matching information and a flow processing method to the user plane network element, where the flow matching information is used to match user plane traffic, and the flow processing method is used to control user plane traffic that matches the flow matching information and that is sent by a terminal matching the abnormal class information.

In a fifth application, the apparatus 1300 may be the security detection network element in any one of the foregoing embodiments, or may be a chip in the security detection network element. For example, when the apparatus 1300 may be the security detection network element, the processing unit 1302 may be, for example, a processor, the communications unit may be, for example, a transceiver, and the transceiver includes a radio frequency circuit. Optionally, the storage unit may be, for example, a memory. For example, when the apparatus 1300 may be the chip in the security detection network element, the processing unit 1302 may be, for example, a processor, and the communications unit may be, for example, an input/output interface, a pin, a circuit, or the like. Optionally, the storage unit is a storage unit inside the chip, such as a register or a cache. Alternatively, the storage unit may be a storage unit that is inside the security detection network element and that is located outside the chip, such as a ROM, another type of static storage device that can store static information and instructions, or a RAM.

Specifically, when the communications unit 1303 includes a sending unit and a receiving unit, the processing unit is configured to determine, based on traffic data of a terminal, that abnormal class information exists, and the sending unit is configured to send the abnormal class information.

In a possible implementation, the sending unit is further configured to send, before the processing unit determines, based on the traffic data of the terminal, that the abnormal class information of UE with an abnormal behavior exists, a data collection service request message to a network device, where the data collection service request message includes a data collection unit and a data collection range, the data collection unit is configured to indicate a format of reported data, and the data collection range is used to instruct to perform collection based on class information of the terminal; and the receiving unit is configured to receive a data collection service response message sent by the network device, where the data collection service response message includes the class information and the traffic data corresponding to the class information, and the traffic data of the terminal indicated by the class information meets a reporting condition.

In a possible implementation, the data collection service request message further includes the reporting condition, and the reporting condition is used to indicate a condition for triggering reporting of the traffic data.

In a possible implementation, the network device includes some or all of the following devices: a mobility management network element, a session management network element, a policy control network element, and a user plane network element.

In a possible implementation, that the processing unit is configured to determine the abnormal class information based on the traffic data of the terminal specifically includes: detecting, based on a security detection algorithm, the traffic data corresponding to the class information, to determine the abnormal class information.

In a sixth application, the apparatus 1300 may be the user plane network element in any one of the foregoing embodiments, or may be a chip in the user plane network element. For example, when the apparatus 1300 may be the user plane network element, the processing unit 1302 may be, for example, a processor, the communications unit may be, for example, a transceiver, and the transceiver includes a radio frequency circuit. Optionally, the storage unit may be, for example, a memory. For example, when the apparatus 1300 may be the chip in the user plane network element, the processing unit 1302 may be, for example, a processor, and the communications unit may be, for example, an input/output interface, a pin, a circuit, or the like. Optionally, the storage unit is a storage unit inside the chip, such as a register or a cache. Alternatively, the storage unit may be a storage unit that is inside the user plane network element and that is located outside the chip, such as a ROM, another type of static storage device that can store static information and instructions, or a RAM.

Specifically, when the communications unit 1303 includes a sending unit and a receiving unit, the receiving unit is configured to receive abnormal class information, flow matching information, and a flow processing method; and the processing unit is configured to control, if user plane traffic matches the flow matching information, and a terminal that sends the user plane traffic matches the abnormal class information, the user plane traffic based on the flow processing method.

In a possible implementation manner, the processing unit is specifically configured to: discard, if the flow processing method includes a discard operation, the user plane traffic; or modify, if the flow processing method includes a quality-of-service modification operation, quality of service of the user plane traffic.

When the apparatus shown in FIG. 13 is a terminal, an access network device, a core network element, a policy control network element, a security detection network element, or a user plane network element, for specific beneficial effects of the method for determining class information and the method for controlling access of a terminal that are performed, refer to related descriptions in the foregoing method embodiments. Details are not described herein again.

Figure 14:
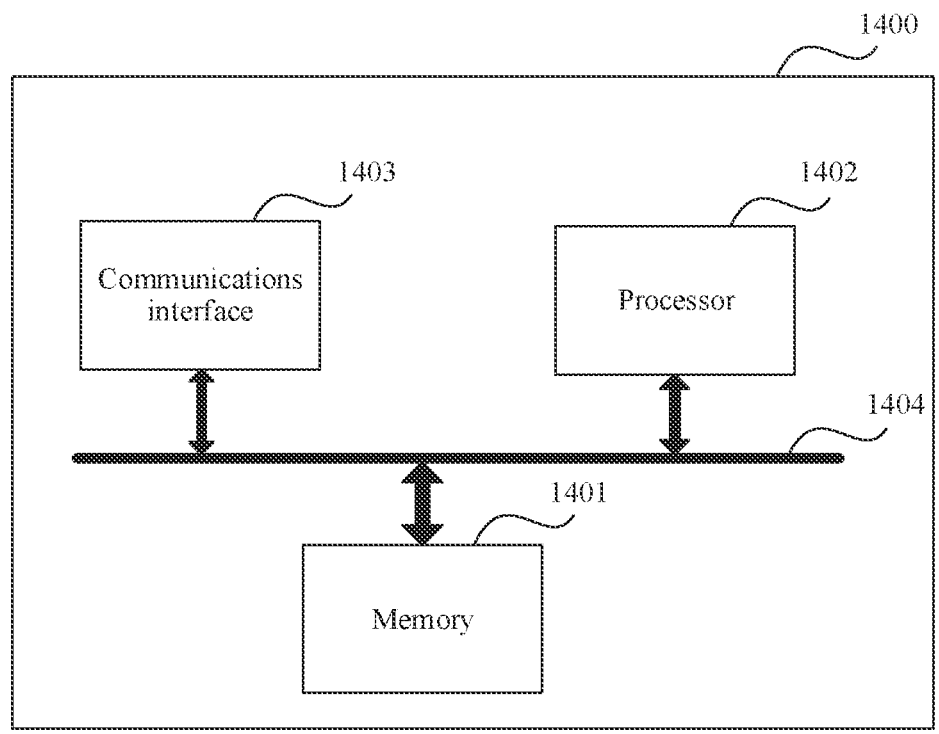
FIG. 14 is a schematic diagram of another apparatus according to this application.

FIG. 14 is a schematic diagram of an apparatus according to this application. The apparatus may be the terminal, the access network device, the mobility management network element, the policy control network element, the user plane network element, or the security detection network element. The apparatus 1400 includes a processor 1402, a communications interface 1403, and a memory 1401. Optionally, the apparatus 1400 may further include a bus 1404. The communications interface 1403, the processor 1402, and the memory 1401 may be connected to each other by using a communication line 1404. The communication line 1404 may be a peripheral component interconnect (PCI for short) bus, an extended industry standard architecture (EISA for short) bus, or the like. The communication line 1404 may be classified into an address bus, a data bus, a control bus, and the like. For ease of representation, only one thick line is used to represent the bus in FIG. 14, but this does not mean that there is only one bus or only one type of bus.

The processor 1402 may be a CPU, a microprocessor, an ASIC, or one or more integrated circuits configured to control program execution in the solutions of this application.

The communications interface 1403 uses any apparatus like a transceiver, and is configured to communicate with another device or a communications network, such as Ethernet, a radio access network (RAN), a wireless local area network (WLAN), or a wired access network.

The memory 1401 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently and is connected to the processor by using the communication line 1404. The memory may be integrated with the processor.

The memory 1401 is configured to store a computer execution instruction for performing the solutions of this application, and execution of the computer execution instruction is controlled by the processor 1402. The processor 1402 is configured to execute the computer execution instruction stored in the memory 1401 to implement the method for determining class information and the method for controlling access of a terminal that are provided in the foregoing embodiments of this application.

Optionally, the computer execution instruction in this embodiment of this application may also be referred to as application program code. This is not specifically limited in the embodiments of this application.

A person of ordinary skill in the art may understand that various reference numerals such as "first" and "second" in this application are merely used for differentiation for ease of description, and are not used to limit a scope of the embodiments of this application, or represent a sequence. The term "and/or" describes an association relationship of associated objects and represents that three relationships may exist. For example, A and/or B may represent the following three cases: only A exists, both A and B exist, and only B exists. The character "/" generally indicates an "or" relationship between the associated objects. "At least one" means one or more. "At least two" means two or more. "At least one of", "any one of", or a similar expression thereof refers to any combination of these items, including any combination of singular items (pieces) or plural items (pieces). For example, at least one item (piece, or type) of a, b, or c may represent: a, b, c, a-b, a-c, b-c, or a-b-c, where a, b, and c may be singular or plural.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the process or functions according to the embodiments of this application are all or partially generated. The computer may be a general-purpose computer, a special-purpose computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave)) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk SSD), or the like.

The various illustrative logical units and circuits described in the embodiments of this application may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor so that the processor can read information from the storage medium and write information to the storage medium. Optionally, the storage medium may further be integrated into a processor. The processor and the storage medium may be disposed in an ASIC, and the ASIC may be disposed in a terminal. Optionally, the processor and the storage medium may alternatively be disposed in different components of the terminal.

These computer program instructions may be alternatively loaded onto a computer or another programmable data processing device so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although this application is described with reference to specific features and the embodiments thereof, obviously, various modifications and combinations may be made to them without departing from the scope of this application. Correspondingly, this specification and the accompanying drawings are merely example description of this application defined by the appended claims and is considered as any or all of modifications, variations, combinations or equivalents that cover the scope of this application. Obviously, a person skilled in the art may make various modifications and variations to this application without departing from the scope of this application. In this way, this application is intended to cover these modifications and variations of this application provided that they fall within the scope of the claims of this application and their equivalent technologies.

What is claimed is:

1. A method for determining class information, comprising:
   sending, by a security detection function network element, a subscription data collection event to a mobility management network element, wherein the subscription data collection event comprises a collection range and a reporting condition, wherein the collection range indicates that data is collected based on class information of a terminal, and wherein the reporting condition indicates a condition for triggering reporting of traffic data;
   receiving, by the security detection function network element, a data collection service response message from the mobility management network element, wherein the data collection service response message comprises first class information and first traffic data corresponding to the first class information, and wherein the first traffic data meets the reporting condition;
   determining, by the security detection function network element, abnormal class information based on the first traffic data, wherein the determining comprises determining, based on the first traffic data, at least one parameter indicating whether a distributed denial of service (DDoS) attack occurs; and
   sending, by the security detection function network element, the abnormal class information to a policy control network element, wherein flow matching information and a flow processing method are generated, wherein the flow matching information is used to match user plane traffic, and wherein the flow processing method is used to control user plane traffic that matches the flow matching information and that is from a terminal matching the abnormal class information.

2. The method according to claim 1, wherein the abnormal class information is used to perform access control on a terminal matching the abnormal class information.

3. The method according to claim 1, wherein the first class information is determined by device information of the terminal.

4. The method according to claim 3, wherein the device information of the terminal comprises a type allocation code (TAC) of an equipment identification code of the terminal.

5. The method according to claim 1, comprising:
   receiving, by the policy control network element, the abnormal class information from the security detection function network element;
   generating, by the policy control network element, the flow matching information and the flow processing method; and
   sending, by the policy control network element, the abnormal class information, the flow matching information, and the flow processing method to a session management network element.

6. The method according to claim 5, wherein the method further comprises:
   receiving, by the policy control network element, a victim ID from the security detection function network element, wherein the victim ID identifies an attacked target, and wherein
   the generating, by the policy control network element, flow matching information comprises generating, by the policy control network element, the flow matching information based on the victim ID.

7. The method according to claim 5, wherein the generating, by the policy control network element, flow matching information and a flow processing method comprises:
generating, by the policy control network element, a policy and charging control rule, wherein the policy and charging control rule comprises the flow matching information and the flow processing method.

8. The method according to claim 7, wherein the policy and charging control rule indicates to discard the user plane traffic that matches the flow matching information and that is from the terminal matching the abnormal class information.

9. A communications apparatus, comprising:
at least one processor; and
one or more memories coupled to the at least one processor and having program instructions stored thereon which, when executed by the at least one processor, cause the apparatus to:
send a subscription data collection event to a mobility management network element, wherein the subscription data collection event comprises a collection range and a reporting condition, wherein the collection range indicates that data is collected based on class information of a terminal, and wherein the reporting condition indicates a condition for triggering reporting of traffic data;
receive a data collection service response message from the mobility management network element, wherein the data collection service response message comprises first class information and first traffic data corresponding to the first class information, and wherein the first traffic data meets the reporting condition;
determine abnormal class information based on the first traffic data, wherein determining the abnormal class information comprises determining, based on the first traffic data, at least one parameter indicating whether a distributed denial of service (DDoS) attack occurs; and
send the abnormal class information to a policy control network element, wherein flow matching information and a flow processing method are generated, wherein the flow matching information is used to match user plane traffic, and wherein the flow processing method is used to control user plane traffic that matches the flow matching information and that is from a terminal matching the abnormal class information.

10. The apparatus according to claim 9, wherein the abnormal class information is used to perform access control on a terminal matching the abnormal class information.

11. The apparatus according to claim 9, wherein the first class information is determined based on device information of the terminal.

12. The apparatus according to claim 11, wherein the device information of the terminal comprises a type allocation code (TAC) of an equipment identification code of the terminal.

13. A non-transitory computer-readable storage medium storing programming instructions for execution by at least one processor, that when executed by the at least one processor, cause a computer to perform operations comprising:
sending, by a security detection function network element, a subscription data collection event to a mobility management network element, wherein the subscription data collection event comprises a collection range and a reporting condition, wherein the collection range indicates that data is collected based on class information of a terminal, and wherein the reporting condition indicates a condition for triggering reporting of traffic data;
receiving, by the security detection function network element, a data collection service response message from the mobility management network element, wherein the data collection service response message comprises first class information and first traffic data corresponding to the first class information, and wherein the first traffic data meets the reporting condition;
determining, by the security detection function network element, abnormal class information based on the first traffic data, wherein the determining comprises determining, based on the first traffic data, at least one parameter indicating whether a distributed denial of service (DDoS) attack occurs; and
sending, by the security detection function network element, the abnormal class information to a policy control network element, wherein flow matching information and a flow processing method are generated, wherein the flow matching information is used to match user plane traffic, and wherein the flow processing method is used to control user plane traffic that matches the flow matching information and that is from a terminal matching the abnormal class information.

14. The non-transitory computer-readable storage medium according to claim 13, wherein the abnormal class information is used to perform access control on a terminal matching the abnormal class information.

15. The non-transitory computer-readable storage medium according to claim 13, wherein the first class information is determined by device information of the terminal.

16. The non-transitory computer-readable storage medium according to claim 15, wherein the device information of the terminal comprises a type allocation code (TAC) of an equipment identification code of the terminal.

17. The non-transitory computer-readable storage medium according to claim 13, the operations comprising:
receiving, by the policy control network element, the abnormal class information from the security detection function network element;
generating, by the policy control network element, the flow matching information and the flow processing method; and
sending, by the policy control network element, the abnormal class information, the flow matching information, and the flow processing method to a session management network element.

18. The non-transitory computer-readable storage medium according to claim 17, the operations comprising:
receiving, by the policy control network element, a victim ID from the security detection function network element, wherein the victim ID identifies an attacked target, and wherein
the generating, by the policy control network element, flow matching information comprises generating, by the policy control network element, the flow matching information based on the victim ID.

19. The non-transitory computer-readable storage medium according to claim 17, wherein the generating, by the policy control network element, flow matching information and a flow processing method comprises:

generating, by the policy control network element, a policy and charging control rule, wherein the policy and charging control rule comprises the flow matching information and the flow processing method.

20. The non-transitory computer-readable storage medium according to claim 19, wherein the policy and charging control rule indicates to discard the user plane traffic that matches the flow matching information and that is from the terminal matching the abnormal class information.

* * * * *